(12) United States Patent
Nomura

(10) Patent No.: US 8,051,051 B2
(45) Date of Patent: Nov. 1, 2011

(54) MAP DATA PRODUCT, MAP DATA PROCESSING PROGRAM PRODUCT, MAP DATA PROCESSING METHOD, AND MAP DATA PROCESSING DEVICE

(75) Inventor: Takashi Nomura, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 1114 days.

(21) Appl. No.: 10/514,423

(22) PCT Filed: May 16, 2003

(86) PCT No.: PCT/JP03/06115
§ 371 (c)(1),
(2), (4) Date: Nov. 16, 2004

(87) PCT Pub. No.: WO03/098578
PCT Pub. Date: Nov. 27, 2003

(65) Prior Publication Data
US 2005/0203937 A1   Sep. 15, 2005

(30) Foreign Application Priority Data
May 17, 2002   (JP) ................................. 2002-143111
May 17, 2002   (JP) ................................. 2002-143112

(51) Int. Cl.
*G06F 17/30* (2006.01)
(52) U.S. Cl. ........................................ 707/694; 707/802
(58) Field of Classification Search .................. 707/620, 707/694, 802
See application file for complete search history.

(56) References Cited

U.S. PATENT DOCUMENTS

| | | | |
|---|---|---|---|
| 6,184,823 B1 | 2/2001 | Smith et al. | |
| 6,650,998 B1 * | 11/2003 | Rutledge et al. | 701/211 |
| 6,985,929 B1 * | 1/2006 | Wilson et al. | 709/217 |
| 2002/0007367 A1 * | 1/2002 | Narahara | 707/500 |
| 2002/0059024 A1 * | 5/2002 | Ogaki | 701/208 |
| 2002/0070981 A1 * | 6/2002 | Kida | 345/833 |
| 2002/0091485 A1 * | 7/2002 | Mikuriya et al. | 701/208 |
| 2002/0191867 A1 * | 12/2002 | Le et al. | 382/300 |

FOREIGN PATENT DOCUMENTS

| | | | | |
|---|---|---|---|---|
| EP | 1134674 A1 * | 9/2001 | | 707/103 R |
| JP | 11-312295 | 11/1999 | | |
| JP | 2001-056823 | 2/2001 | | |
| JP | 2001-082965 | 3/2001 | | |
| JP | 2001-110000 | 4/2001 | | |
| WO | WO 01/13069 A1 | 2/2001 | | |

OTHER PUBLICATIONS

International Search Report dated Jul. 31, 2003.
The Extended European Search Report dated Feb. 14, 2011 (Five (5) pages).

* cited by examiner

Primary Examiner — Son T Hoang
(74) Attorney, Agent, or Firm — Crowell & Moring LLP

(57) ABSTRACT

A first data product that can be read into a computer or a map data processing apparatus, contains therein map data having map-related information of a map. The map data includes: a structure having the map-related information divided into units of a plurality of divisions into which the map is divided; and a structure having management information for the map-related information divided into units of the divisions, and: the map-related information obtained by the computer or the map data processing apparatus can be updated in units of the individual divisions by using the management information.

15 Claims, 15 Drawing Sheets

MAP DATA PRODUCT, MAP DATA PROCESSING PROGRAM PRODUCT, MAP DATA PROCESSING METHOD, AND MAP DATA PROCESSING DEVICE

INCORPORATION BY REFERENCE

The disclosures of the following priority applications are herein incorporated by reference: Japanese Patent Application No. 2002-143111 filed May 17, 2002 Japanese Patent Application No. 2002-143112 filed May 17, 2002

TECHNICAL FIELD

The present invention relates to a map data product, a map data processing program product, a map data processing method and a map data processing apparatus.

BACKGROUND ART

Map data of road maps and the like used in navigation systems are provided in a recording medium such as a CD ROM, a DVD-ROM or the like in the related art. In addition, map data are provided through communication to a navigation system installed in a vehicle.

However, a system that updates with a high degree of efficiency part of the map data with a large volume provided in a recording medium or the like and allows new and old map data to be used efficiently and with consistency is not provided in the related art.

DISCLOSURE OF THE INVENTION

The present invention provides a map data product, a map data processing program product, a map data processing method and a map data processing apparatus that make it possible to update part of map data with a large volume provided in a recording medium or the like with a high degree of efficiency and allow the new and old map data to be used with efficiency and consistency.

A first data product according to the present invention that can be read into a computer or a map data processing apparatus, contains therein map data having map-related information of a map. The map data comprises: a structure having the map-related information divided into units of a plurality of divisions into which the map is divided; and a structure having management information for the map-related information divided into units of the divisions, and: the map-related information obtained by the computer or the map data processing apparatus can be updated in units of the individual divisions by using the management information.

In this first data product, it is preferred that: the map is divided into a plurality of first division units, the first division units are each divided into a plurality of second division units, a number of the second division units is equal among the individual first division units, and the divisions into which the map is divided each corresponding to one of the second division units; and the management information contains a set of management information related to the plurality of second division units, provided in correspondence to each of the first division units. In this case, it is preferred that the management information further contains management information related to the plurality of first division units.

Also, in the first data product, it is preferred that: a plurality of levels are defined, each in correspondence to one of a plurality of different scaling factors at which the map is rendered; the map is divided into a plurality of first division units at each level, the first division units are each divided into a plurality of second division units, the number of second division units is equal among the individual first division units, and the divisions into which the map is divided each corresponding to one of the second division units; a plurality of sets of the map-related information are provided in correspondence to the plurality of levels; and the management information contains a set of management information related to the plurality of first division units provided in correspondence to each of levels, and also contains a set of management information related to the plurality of second division units provided in correspondence to each of the first division units.

Also, in the first data product, it is preferred that the map-related information which is provided in units of the individual divisions is separated into different types of map-related information to be individually managed.

Also, in the first data product, it is preferred that: a plurality of levels are defined, each in correspondence to one of a plurality of different scaling factors at which the map is rendered; a plurality of sets of the map-related information are provided in correspondence to the plurality of levels; and as the map-related information provided in units of the individual divisions, at least one type of map-related information available at all levels and another type of map-related information available at, at least, one level are provided separately from each other. In this case, it is preferred that: the one type of map-related information is used to display the map at a display device; and the other type of map-related information contains information used in route search.

Also, in the first data product, it is preferred that: a connecting point at which the map-related information corresponding to one of two divisions is correlated to the map-related information corresponding to the other division is present at a geographically matching position within the two divisions; and sets of information related to the connecting point contain common two-dimensional coordinate values indicating the position of the connecting point within the map in the map-related information corresponding to the two divisions. In this case, it is preferred that the two-dimensional coordinate values are values corresponding to latitudinal and longitudinal values. Furthermore, it is preferred that the information related to the connecting point contains a parameter other than the two-dimensional coordinate values of the connecting point in addition to the two-dimensional coordinate values. In this case, it is preferred that the parameter contains height information indicating a height of the connecting point. Furthermore, it is preferred that the parameter contains time information related to generation and update of the map-related information provided in units of the individual divisions. Yet furthermore, it is preferred that: a plurality of levels are defined, each in correspondence to one of a plurality of different scaling factors at which the map is rendered; a plurality of sets of the map-related information are provided in correspondence to the plurality of levels; the map is divided into a plurality of divisions at each level, and each of the plurality of sets of map-related information, corresponding to a given level, is divided in units of the individual divisions into which the map is divided; the two divisions belong to levels different from each other, and two-dimensional coordinate values of the connecting point at a level at which the map is rendered in greater detail are attached to the two-dimensional coordinate values of the connecting point at a given level.

Also, in the first data product, it is preferred that: the map-related information provided in units of individual divisions is separated into different types of map-related information to be individually managed; and map-related information having the highest priority among the different types of map-related information is managed by setting a predetermined upper limit to the size thereof. In this case, it is preferred that: if the size of the map-related information having the highest priority exceeds the predetermined upper limit after update, at least map-related information corresponding to an excess beyond the predetermined upper limit to the size, which results from the update, is managed as map-related information with lower priority relative to the highest priority. Furthermore, it is preferred that the map-related information with the highest priority includes at least information used to display the map at a display device. Also, it is preferred that: the map-related information with the highest priority includes at least information used to display the map at a display device; and the map-related information with the lower priority relative to the highest priority includes information that enables display of a more detailed map at the display device, compared to the map displayed by using the map-related information with the highest priority.

It is preferred that the above data products are each embodied as a recording medium having the map data recorded therein.

A map data processing apparatus according to the present invention, comprises: a recording medium drive unit at which a data product is loaded; an update data acquisition unit that obtains update data for the map-related information provided in units of the individual divisions; and a processing unit that processes the map data based upon the map data recorded in the recording medium and the update data obtained by the update data acquisition unit.

In this map data processing apparatus, it is preferred that: the map data are map display data; and the processing unit displays a map at a display unit by connecting the map data recorded in the recording medium with the update data obtained by the update data acquisition unit.

Also, it is preferred that: the map data are route search data; and the processing unit executes route search processing by connecting the map data recorded in the recording medium with the update data obtained by the update data acquisition unit.

A method for processing map data in a map data processing apparatus, according to the present invention, comprises steps for: reading map data management information indicating specific positions in a recording medium, at which map data divided into a plurality of divisions are stored, from the recording medium having stored therein the plurality of map data divisions and the management information into a nonvolatile memory within a map data processing apparatus; altering part of the management information in the nonvolatile memory corresponding to update data so as to indicate a position at which the update data are stored, when the update data for partially updating the map data in units of the individual divisions are obtained; and accessing the map data based upon the management information in the nonvolatile memory.

A program product that can be read into a computer or a map data processing apparatus, according to the present invention, contains a map data processing program executed to process map data. The map data processing program comprises: an instruction code for reading map data management information indicating specific positions in a recording medium, at which map data divided into a plurality of divisions are stored, from the recording medium having stored therein the plurality of map data divisions and the management information into a nonvolatile memory within a map data processing apparatus; an instruction code for altering part of the management information in the nonvolatile memory corresponding to update data so as to indicate a position at which the update data are stored, when the update data for partially updating the map data in units of the individual divisions are obtained; and an instruction code for accessing the map data based upon the management information in the nonvolatile memory.

A map data processing apparatus according to the present invention that processes map data, comprises: a recording medium drive unit at which a recording medium is loaded having stored therein the map data divided into a plurality of divisions and map data management information indicating specific storage positions of the plurality of map data divisions in the recording medium; a nonvolatile memory into which the management information read from the recording medium is stored; an update data acquisition unit that obtains update data to be used to update part of the map data in units of the individual divisions; and a control unit that alters part of the management information in the nonvolatile memory corresponding to the updated data so as to indicate a storage position of the update data when the update data acquisition unit obtains the update data, and accesses the map data based upon the management information in the nonvolatile memory.

Another method for processing map data in a map data processing apparatus, according to the present invention, comprises steps for: confirming that a recording medium is loaded at the map data processing apparatus, the recording medium having stored therein the map data divided into a plurality of divisions and map data management information indicating specific storage positions of the plurality of map data divisions in the recording medium; storing identification information, which bears an initial value indicating that the map data management information used in the map data processing apparatus is stored in the recording medium, into a first nonvolatile memory; storing update data obtained to update part of the map data in units of individual divisions into a second nonvolatile memory, obtaining the map data management information from the recording medium, altering part of the management information corresponding to the update data so as to indicate a storage position of the update data in the second nonvolatile memory, storing the management information into a third nonvolatile memory, and altering the identification information stored in the first nonvolatile memory to identification information indicating that the map data management information is stored in the third nonvolatile memory; obtaining the identification information to ascertain whether the map data management information is stored in the recording medium or in the third nonvolatile memory by accessing the first nonvolatile memory when accessing the map data; obtaining the map data management information from the recording medium if the map data management information is determined to be stored in the recording medium; obtaining the map data management information from the third nonvolatile memory if the map data management information is determined to be stored in the third nonvolatile memory; and accessing the map data based upon the obtained map data management information.

Another program product according to the present invention that can be read into a computer or a map data processing apparatus, contains a map data processing program executed to process map data. The map data processing program comprises: an instruction code for confirming that a recording medium is loaded at the map data processing apparatus, the recording medium having stored therein the map data divided into a plurality of divisions and map data management information indicating specific storage positions of the plurality of map data divisions in the recording medium; an instruction code for storing identification information, which bears an initial value indicating that the map data management information used in the map data processing apparatus is stored in the recording medium, into a first nonvolatile memory; an instruction code for storing update data obtained to update part of the map data in units of individual divisions into a second nonvolatile memory, obtaining the map data management information from the recording medium, altering part of the management information corresponding to the update data so as to indicate a storage position of the update data in the second nonvolatile memory, storing the management information into a third nonvolatile memory, and altering the identification information stored in the first nonvolatile memory to identification information indicating that the map data management information is stored in the third nonvolatile memory; an instruction code for obtaining the identification information to ascertain whether the map data management information is stored in the recording medium or in the third nonvolatile memory by accessing the first nonvolatile memory when accessing the map data; an instruction code for obtaining the map data management information from the recording medium if the map data management information is determined to be stored in the recording medium; an instruction code for obtaining the map data management information from the third nonvolatile memory if the map data management information is determined to be stored in the third nonvolatile memory; and an instruction code for accessing the map data based upon the obtained map data management information.

Another map data processing apparatus according to the present invention that processes map data, comprises: a recording medium drive unit at which a recording medium having stored therein the map data divided into a plurality of divisions and map data management information indicating specific storage positions of the plurality of map data divisions in the recording medium is loaded; a first nonvolatile memory in which identification information bearing an initial value indicating that map data management information used in the map data processing apparatus is stored in the recording medium is stored when the recording medium is loaded into the recording medium drive unit; an update data acquisition unit that obtains update data to be used to update part of the map data in units of the individual divisions; a second nonvolatile memory in which the update data obtained by the update data acquisition unit are stored; a control unit that obtains the map data management information from the recording medium when the update data acquisition unit obtains the update data, alters part of the management information corresponding to the update data so as to indicate a storage position of the update data in the second nonvolatile memory and alters the identification information stored in the first nonvolatile memory to identification information indicating that the map data management information is stored in a third nonvolatile memory; and the third nonvolatile memory in which the map data management information having been altered by the control unit is stored, wherein: the control unit obtains the identification information by accessing the first nonvolatile memory to ascertain whether the map data management information is stored in the recording medium or in the third nonvolatile memory when accessing the map data, obtains the map data management information from the recording medium if the map data management information is determined to be stored in the recording medium, obtains the map data management information from the third nonvolatile memory if the map data management information is determined to be stored in the third nonvolatile memory, and accesses the map data based upon the obtained map data management information.

Another method for processing map data in a map data processing apparatus, according to the present invention, comprises steps for; confirming that a recording medium is loaded at the map data processing apparatus, the recording medium having stored therein the map data divided into a plurality of divisions and map data management information indicating specific storage positions of the plurality of map data divisions in the recording medium; storing identification information, which bears an initial value indicating that the map data management information used in the map data processing apparatus is stored in the recording medium, into a first nonvolatile memory; confirming a connection with a second nonvolatile memory in which update data used to update part of the map data in units of the individual divisions are written; obtaining the map data management information from the recording medium when the connection with the second nonvolatile memory is confirmed, altering part of the management information corresponding to the update data so as to indicate a storage position of the update data in the second nonvolatile memory, storing the management information into a third nonvolatile memory and altering the identification information stored in the first nonvolatile memory to identification information indicating that the map data management information is stored in the third nonvolatile memory; obtaining the identification information to ascertain whether the map data management information is stored in the recording medium or in the third nonvolatile memory by accessing the first nonvolatile memory when accessing the map data; obtaining the map data management information from the recording medium if the map data management information is determined to be stored in the recording medium; obtaining the map data management from the third nonvolatile memory if the map data management information is determined to be stored in the third nonvolatile memory; and accessing the map data based upon the obtained map data management information.

Another program product according to the present invention that can be read into a computer or a map data processing apparatus, contains a map data processing program executed to process map data. The map data processing program comprises: an instruction code for confirming that a recording medium is loaded at the map data processing apparatus, the recording medium having stored therein the map data divided into a plurality of divisions and map data management information indicating specific storage positions of the plurality of map data divisions in the recording medium; an instruction code for storing identification information, which bears an initial value indicating that the map data management information used in the map data processing apparatus is stored in the recording medium, into a first nonvolatile memory; an instruction code for confirming a connection with a second nonvolatile memory in which update data used to update part of the map data in units of the individual divisions are written; an instruction code for obtaining the map data management information from the recording medium when the connection with the second nonvolatile memory is confirmed, altering part of the management information corresponding to the update data so as to indicate a storage position of the update data in the second nonvolatile memory, storing the management information into a third nonvolatile memory and altering the identification information stored in the first nonvolatile memory to identification information indicating that the map data management information is stored in the third nonvolatile memory; an instruction code for obtaining the identification information to ascertain whether the map data management information is stored in the recording medium or in the third nonvolatile memory by accessing the first nonvolatile memory when accessing the map data; an instruction code for obtaining the map data management information from the recording medium if the map data management information is determined to be stored in the recording medium; an instruction code for obtaining the map data management from the third nonvolatile memory if the map data management information is determined to be stored in the third nonvolatile memory; and an instruction code for accessing the map data based upon the obtained map data management information.

Another map data processing apparatus, according to the present invention, that processes map data, comprises: a recording medium drive unit at which a recording medium having stored therein the map data divided into a plurality of divisions and map data management information indicating specific storage positions of the plurality of map data divisions in the recording medium is loaded; a first nonvolatile memory in which identification information bearing an initial value indicating that map data management information used in the map data processing apparatus is stored in the recording medium is stored when the recording medium is loaded into the recording medium drive unit; a memory connection unit that enables a connection with a second nonvolatile memory in which update data used to update part of the map data in units of the individual divisions are written; a control unit that obtains the map data management information from the recording medium when a connection of the second nonvolatile memory with the memory connection unit is confirmed, alters part of the management information corresponding to the update data so as to indicate a storage position of the update data in the second nonvolatile memory and alters the identification information stored in the first nonvolatile memory to identification information indicating that the map data management information is stored in a third nonvolatile memory; and the third nonvolatile memory in which the map data management information having been altered by the control unit is stored, and: the control unit obtains the identification information by accessing the first nonvolatile memory to ascertain whether the map data management information is stored in the recording medium or in the third nonvolatile memory when accessing the map data, obtains the map data management information from the recording medium if the map data management information is determined to be stored in the recording medium, obtains the map data management information from the third nonvolatile memory if the map data management information is determined to be stored in the third nonvolatile memory, and accesses the map data based upon the obtained map data management information.

It is preferred that the above program products are each embodied as a recording medium having recorded therein the map data processing program.

BEST MODE FOR CARRYING OUT THE INVENTION

Figure 1:
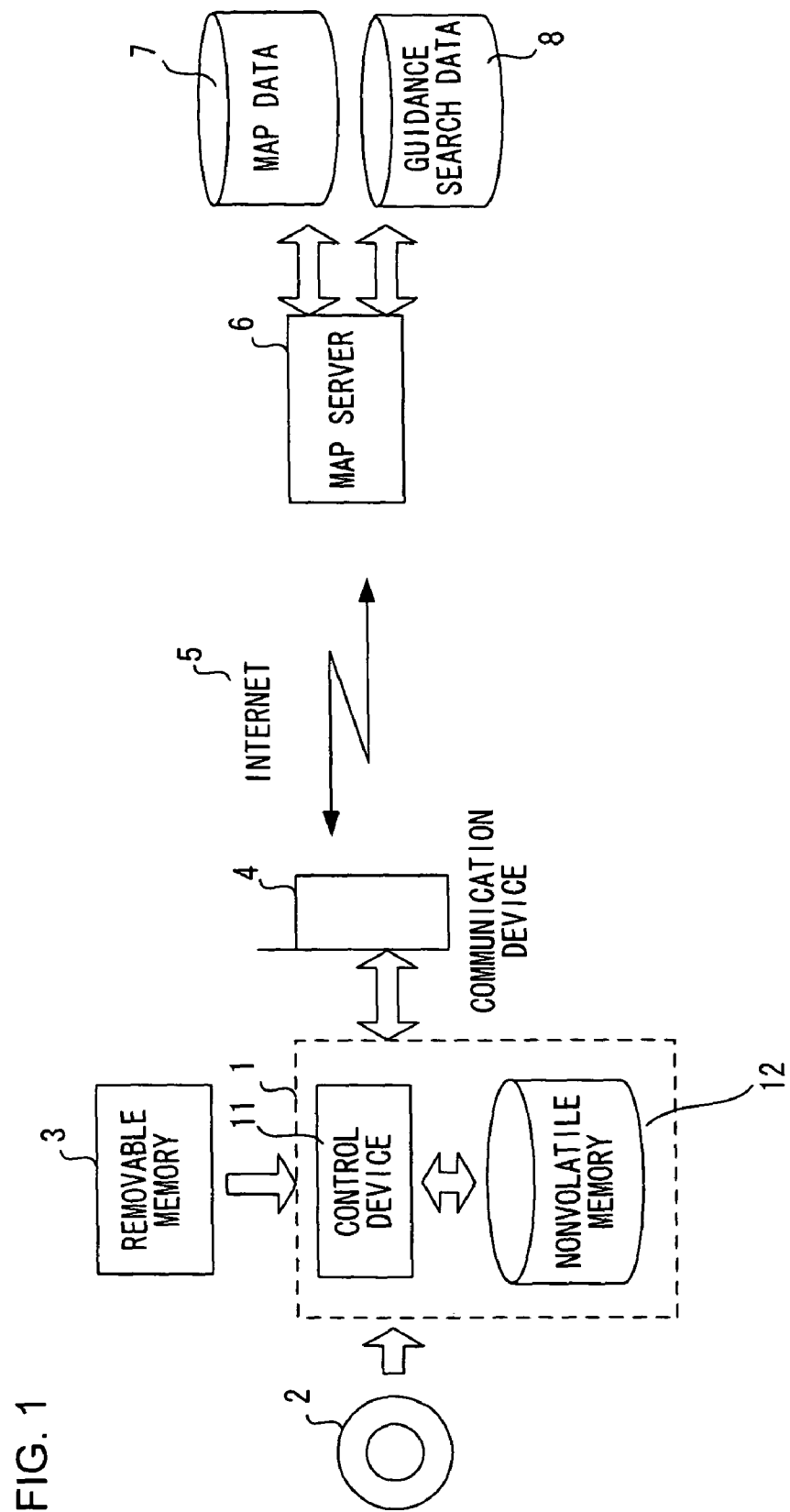
FIG. 1 shows how map data adopting the map data structure according to the present invention are exchanged.

FIG. 1 shows how map data adopting the map data structure according to the present invention are exchanged. An on-vehicle navigation system 1 reads map data, management information, guidance search data and the like from a recording medium 2 which may be a CD ROM or a DVD ROM. It receives update data to be used to update the map data and the like from a removable memory 3. The removable memory 3 is a detachable recording medium having recorded therein the update data or the like to be used to update part of the map data.

In addition, the navigation system 1 can be connected to a communication device 4 such as a portable telephone. The navigation system 1 can be connected to the Internet 5 via the communication device 4 and can be further connected with a map server 6 via the Internet 5. At the map server 6, map data from old versions up to and including the latest version of map data, are held at a map database 7, and guidance search data from old versions up to and including the most recent guidance search data, are held at a guidance search database 8. Thus, the map server 6 is capable of providing update data to be used to update part of the map data to the navigation system 1 via the Internet 5. It is to be noted that the guidance search data contain position information indicating the positions of POIs and the like and attribute information indicating the specific types, the names and the like of the POIs and the like.

The navigation system 1 includes a control device 11 and a nonvolatile memory 12. The control device 11 is constituted with a microprocessor and its peripheral circuits. The nonvolatile memory 12 is a nonvolatile memory such as a hard disk or a flash memory installed inside the navigation system 1. The nonvolatile memory 12 may be any type of storage device as long as data written therein are retained even when the power to the navigation system 1 is turned off.

Once the recording medium 2 is loaded into the navigation system 1, it remains loaded in the navigation system 1 until it is replaced with a new recording medium 2. Accordingly, it may be referred to as a fixed medium as opposed to the removable memory 3. The map database 7 and the guidance search database 8, which hold all the versions of map data and guidance search data, from the oldest to the most recent, are databases holding mother data. Using the data at the map database 7 and the guidance search database 8, the map server 6 can prepare a recording medium 2 having recorded therein initial (pre-update) map data or a removable memory 3 having stored therein update data to be used for data update.

Figure 2:
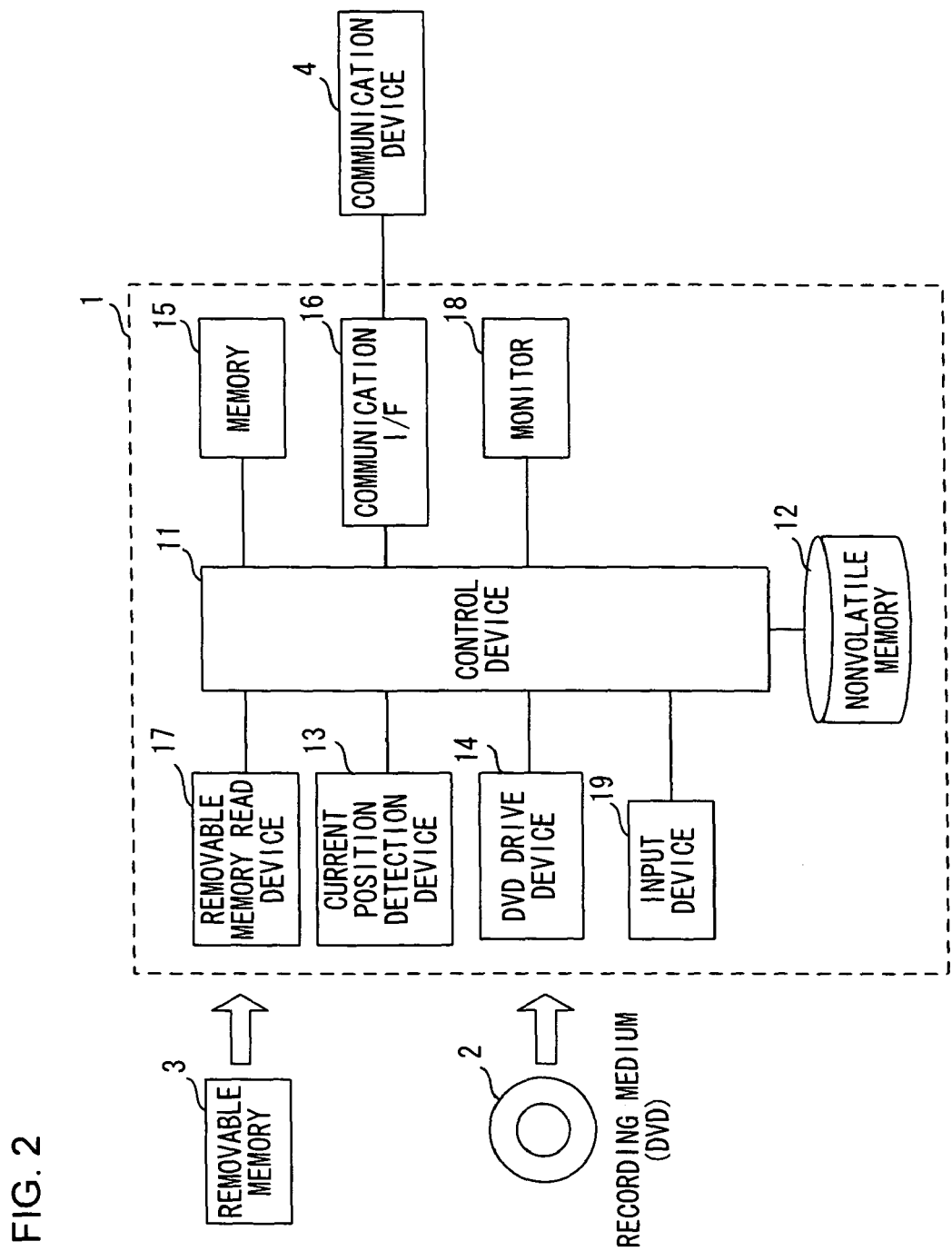
FIG. 2 is a block diagram of an on-vehicle navigation system.

FIG. 2 is a block diagram of the on-vehicle navigation system 1. The navigation system 1 comprises the control device 11, the nonvolatile memory 12, a current position detection device 13, a DVD drive device 14, a memory 15, a communication interface 16, a removable memory read device 17, a monitor 18 and an input device 19.

The current position detection device 13, which detects the current position of the vehicle, may be constituted with, for instance, an azimuth sensor that detects the advancing azimuth of the vehicle, a vehicle speed sensor that detects the vehicle speed, a GPS sensor that detects a GPS signal transmitted from a GPS (global positioning system) satellite and the like. The DVD drive device 14 reads map data and the like in the recording medium 2 loaded therein. In the embodiment, the recording medium 2 is a DVD ROM. However, the recording medium 2 may be a CD ROM or another type of recording medium.

The memory 15 is used to store the vehicle position information detected with the current position detection device 13 and the like and also to store node information, link information and the like of the nodes and the links on a recommended route calculated by the control device 11. In addition, full mesh management information which is to be detailed later is stored in the memory 15. The memory 15 constitutes a working area of the control device 11. The communication interface 16 is used to achieve a connection with the communication device 4. The use of a portable telephone and an Internet connection are enabled via the communication interface 16. Data in the removable memory 3 can be read with the removable memory read device 17 at which the removable memory 3 is loaded.

The monitor 18 is a display device at which a map, a recommended route and various types of information are displayed. The monitor 18 may be provided as an integrated part of the navigation system main unit or it may be provided as a separate casing. In addition, the monitor 18 disposed at an isolated position may be connected to the navigation system main unit through a cable or the like. Through the input device 19, the destination for the vehicle and the like are entered when conducting a route search. It may be constituted as a remote-control unit or it may be constituted as a touch panel disposed on the screen at the monitor 18. The control device 11 executes various types of navigation processing such as road map display, route search and route guidance by using the current vehicle position information detected with the current position detection device 13, the map data stored in the recording medium 2 or the nonvolatile memory 12. It is to be noted that a program of the various types of processing executed by the control device 11 is installed in a ROM (not shown) provided inside the control device 11.

—Map Data Structure—

The data structure adopted in the map data mentioned above is now explained in further detail. The map data are information related to maps and include background (for map display) data, locator data, network (for route search) data and guidance data (information indicating intersecting point names, node names, directional terms, directional guidance facility information and the like). The background data are used to display a background of a road or a background in a road map. The locator data are used to specify the current vehicle position for map matching and the like. The network data, which are route search data constituted with branching information and the like not directly relevant to the specific road shapes, are mainly used when calculating a recommended route (when executing a route search). The guidance data include the names of intersecting point and the like, and are used to provide guidance for the driver or the like along the recommended route based upon the calculated recommended route.

The map data are managed based upon a concept that they are provided at different levels in blocks and meshes in the embodiment. In the embodiment, the map data are divided into seven different levels of data, with each level corresponding to a specific scaling factor. Level 0 corresponds to the scaling factor at which the map is provided with the most detail, and at level 6, the map is provided as the widest-area map. While the different levels of map data are provided at varying scaling factors, a common area is covered by the various levels of map data. Namely, supposing that the subject area is the entire nation of Japan, map data of the entire nation of Japan are provided at each level with a scaling factor different from the scaling factors corresponding to the other levels. For instance, at level 0, map data of the entire nation of Japan are provided at a scaling factor of $1/6250$, at level 3, map data of the entire nation of Japan are provided at a scaling factor of $1/400{,}000$, at level 4, map data of the entire nation of Japan are provided at a scaling factor of $1/1{,}600{,}000$, and at level 6, map data of the entire nation of Japan are provided at a scaling factor of $1/128{,}000{,}000$. In other words, seven sets of map data are provided in correspondence to levels 0 to 6.

Figure 3:
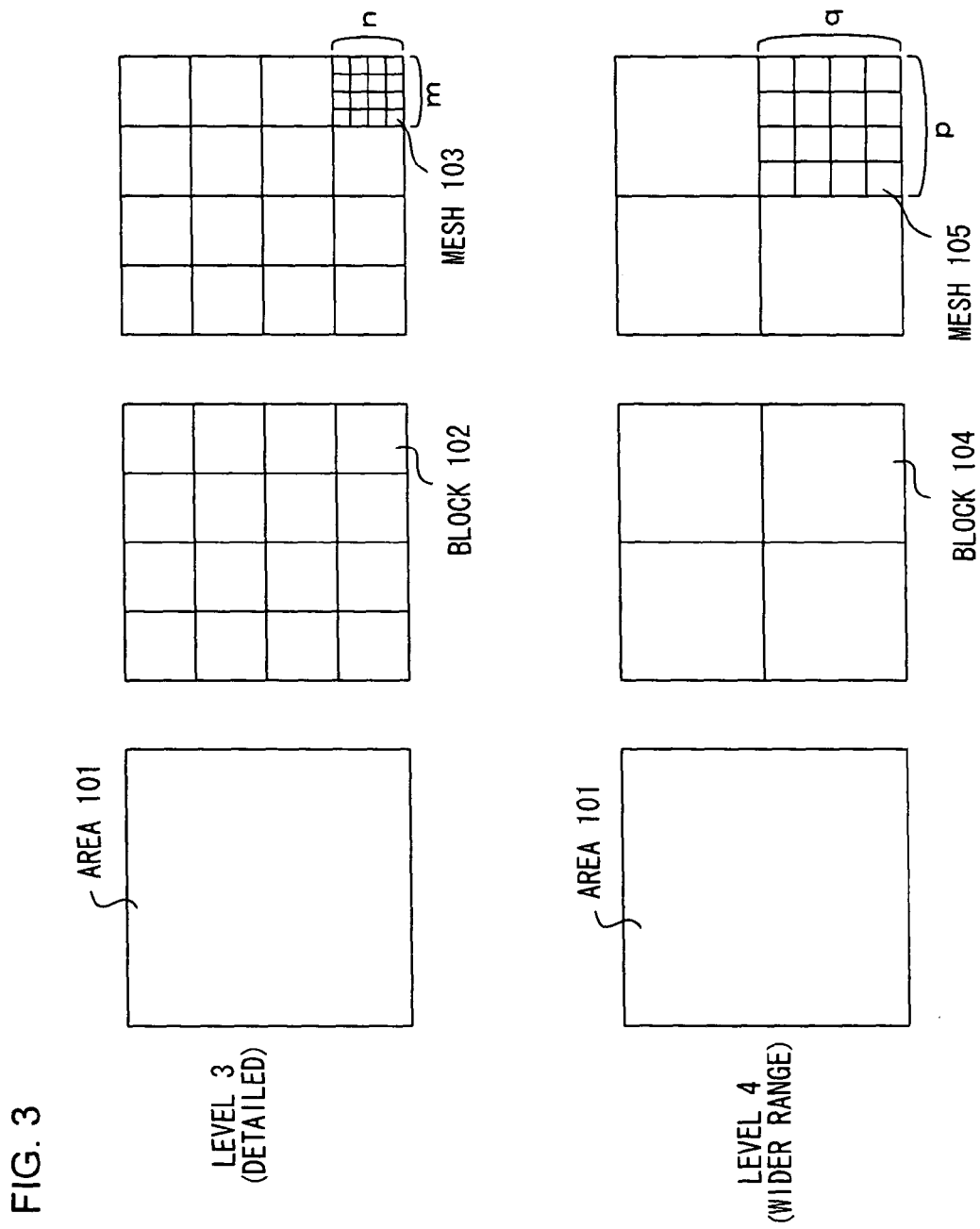
FIG. 3 is a conceptual diagram illustrating the relationships among the levels, the blocks and the meshes of the map data.

FIG. 3 is a conceptual diagram provided to facilitate an explanation of the relationships among the map data levels, blocks and meshes. FIG. 3 shows map data at levels 3 and 4 as an example. Reference numeral 101 indicates the subject area covered by the map data. Assuming that the map data cover the entire nation of Japan, the area 101 is a range that contains the entire nation of Japan. The same range of subject area is covered at levels 3 and 4. At level 3, the area 101 is managed as a plurality of blocks 102, i.e., 4×4=16 blocks. Each block 102 is divided into a plurality of meshes 103 and is managed with the meshes. In the embodiment, the data in the block are managed as m×n sets of mesh data. The blocks 102 of map data at the same level are each divided into m×n meshes.

At level 4, the area 101 is managed with a plurality of blocks 104, i.e., 2×2=4 blocks. Each block 104 is divided into a plurality of meshes 105 and is managed with the meshes. In the embodiment, the data in the block are managed as p×q sets of mesh data. The blocks 104 of map data at the same level are each divided into p×q meshes.

At levels 3 and 4, the area 101 is divided into different numbers of blocks and the individual blocks are divided into different numbers of meshes, since different volumes of data are handled at level 4 with a smaller scaling factor (a larger denominator) providing a wider area map and at level 3 with a larger scaling factor (a smaller denominator) providing a more detailed map compared to level 4. Namely, the map data are divided as appropriate in correspondence to the volume of data handled at each level. However, at a given level, the size of the individual blocks and the size of the individual meshes remain constant. It is to be noted that the numbers of blocks that the area 101 is divided into at the two levels in FIG. 3 simply represent an example and the area 101 may be divided into different numbers of blocks.

The terms "blocks" and "meshes" in this context are used for convenience in the explanation of the embodiment, and other terms may be used as well. Meshes may instead be referred to as parcels, or blocks may be referred to as first division units and meshes may be referred to as second division units. In addition, the blocks and meshes may be considered to be units obtained by geographically dividing the data.

Figure 4:
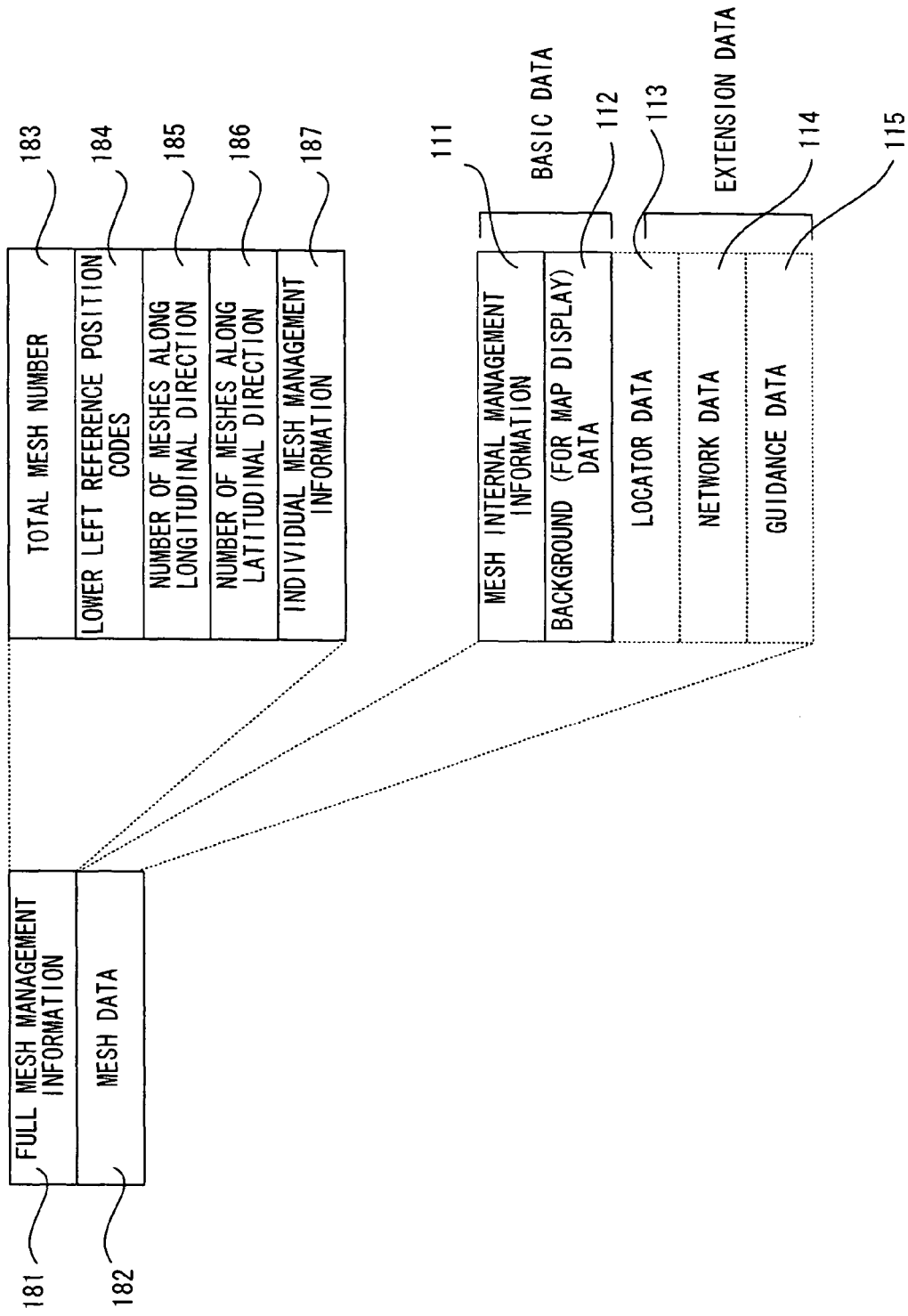
FIG. 4 shows the data structure assumed in one of the meshes in FIG. 3.

FIG. 4 shows the structure of full mesh management information 181 used to manage all the meshes in a block and the structure of mesh data 182. The mesh data 182 are map data provided in correspondence to each of the meshes 103 or 105 described earlier. The full mesh management information 181 includes management information for all the mesh data contained in the block, and is provided in correspondence to each block.

A total mesh number 183 in the full mesh management information 181 in FIG. 4 indicates the total number of meshes contained in the block. Position information related to the latitude and longitude of the lower left point of the block is entered as a lower left reference position code 184. A longitudinal mesh number 185 indicates the number of meshes set east to west along the longitudinal direction, and m is entered for the longitudinal mesh number 185 at level 3 in FIG. 3. A latitudinal mesh number 186 indicates the number of meshes set south to north along the latitudinal direction, and n is entered for the latitudinal mesh number 186 at level 3 in FIG. 3. Individual mesh management information 187 is used to manage individual sets of mesh data 182 and the number of sets of mesh management information 187 corresponds to the number of meshes in the block.

Each set of mesh data 182 is constituted with mesh internal management information 111, background (for map display) data 112, locator data 113, network (for route calculation) data 114 and guidance data 115. The mesh internal management information 111 and the background (for map display) data 112 constitute basic data, whereas the locator data 113, the network data 114 and the guidance data 115 constitute extension data. The basic data are included at all the levels of data. The mesh data at a given level contain specific extension data inherent to the level. For instance, the network data are contained in the data at levels 1, 2, 3 and 4, whereas the locator data and the guidance data are provided in the data at level 0. It is to be noted that address calculation data, image data, VICS data, building attribute data, peripheral area search data and the like may also be provided as extension data.

It is to be noted that the data are managed by setting an upper limit to the data size of the basic data in the embodiment. The data size upper limit may be set to, for instance, 32 KB. If the basic data size exceeds the upper limit value after updating map data, the excess data are managed as extension data. Let us consider a case in which a set of mesh data 182 initially contains 20 KB of basic data and 10 KB of extension data, the basic data alone are updated and the data size of the basic data increases to 40 KB as a result. The updated basic data are edited so as to keep the basic data size equal to or under 32 KB, and the excess 8 KB of basic data is managed as extension data. As a result, the size of the extension data increases to 18 KB, and the size of the overall mesh data 182 increases from 30 KB to 50 KB. If, on the other hand, the mesh data 182 initially contains 20 KB of basic data and 10 KB of extension data and the basic data alone are updated to increase the basic data size to 30 KB, the basic data size still does not exceed the upper limit 32 KB, and the additional 10 KB of basic data is held as part of the basic data. Thus, the size of the basic data after the update increases to 30 KB, the size of the extension data remains at 10 KB, and the size of the overall mesh data 182 increases from 30 KB to 40 KB. The upper limit is set for the data size of the basic data as described above for the following reason.

The navigation system 1 may be used for a number of years without installing additional memory under normal circumstances. For this reason, it is desirable to use a fixed size of map data, which matches the performance level of the navigation system 1 that is likely to be used for years. However, the volume of the map data is likely to increase over time as building shape data become more accurate, more detailed topographical data become available, and land development and rezoning take place. Accordingly, the map data adopt a structure which allows the map data to be updated in units of individual meshes in the embodiment.

When a new model navigation system comes onto the market, it usually has a greater memory capacity, a higher processing capability and the like. As a result, the volume of data that can be handled by the program increases, new functions are added or more detailed display becomes possible under normal circumstances. In this situation, the updated map data need to have a structure that allows the updated map data to be utilized commonly in the old navigation system and the new navigation system.

To satisfy the needs described above, the basic data are edited to maintain the data size which allows the basic data to be handled in the old navigation system as well as the new navigation system and the excess data are stored as extension data. In addition, data that are only needed in conjunction with a new function that cannot be used in the old type of navigation system, too, are stored as extension data.

The concept explained above by using the expression "old and new types of navigation systems" also applies to "general-purpose and high-performance" navigation systems or "portable and on-vehicle navigation systems" as well as "old and new" navigation systems. In other words, the structure of the map data achieved in the embodiment allows the map data to be utilized commonly in a system with a low processing capability and in a system with a high processing capability. The type of map data which is invariably utilized regardless of the level of the processing capability of the system is referred to as basic data. The upper limit to the size of the basic data is set in conformance to the memory size or the like of a system with the lowest processing capability. Since this makes it possible to commonly utilize the map data in the embodiment in systems with varying levels of processing capability, a higher degree of efficiency in map data management and a cost-reduction are achieved.

It is to be noted that the initial basic data, which are commonly used at varying levels of processing capability, may be regarded as high-priority data. The additional basic data resulting from an update, on the other hand, are background data to be used to display a more detailed map than the map displayed by using the initial basic data or nonessential, low priority background data that do not need to be displayed in the old model. It goes without saying that as long as the additional basic data can be managed as part of the basic data, the size of which is kept equal to or less than the upper limit, the additional basic data can be regarded as data with the same priority as the initial basic data.

No specific upper limit is set for the data size of the mesh data 182 in the explanation given above. However, an upper limit to the data size of the mesh data 182 may be set in correspondence to the capacity of the memory within the navigation system 1. For instance, the upper limit to the size of the mesh data 182 may be set to 128 KB. It is to be noted that values other than 32 KB and 128 KB may be set for the upper limits to the data sizes of the basic data and the mesh data 182, as well. The upper limits should be set to appropriate values by taking into consideration the initial performance level of the navigation system when the map data are originally defined, a subsequent improvement in the performance that is anticipated for the future and the like.

-Map Data Management in the Navigation System—

Figure 5:
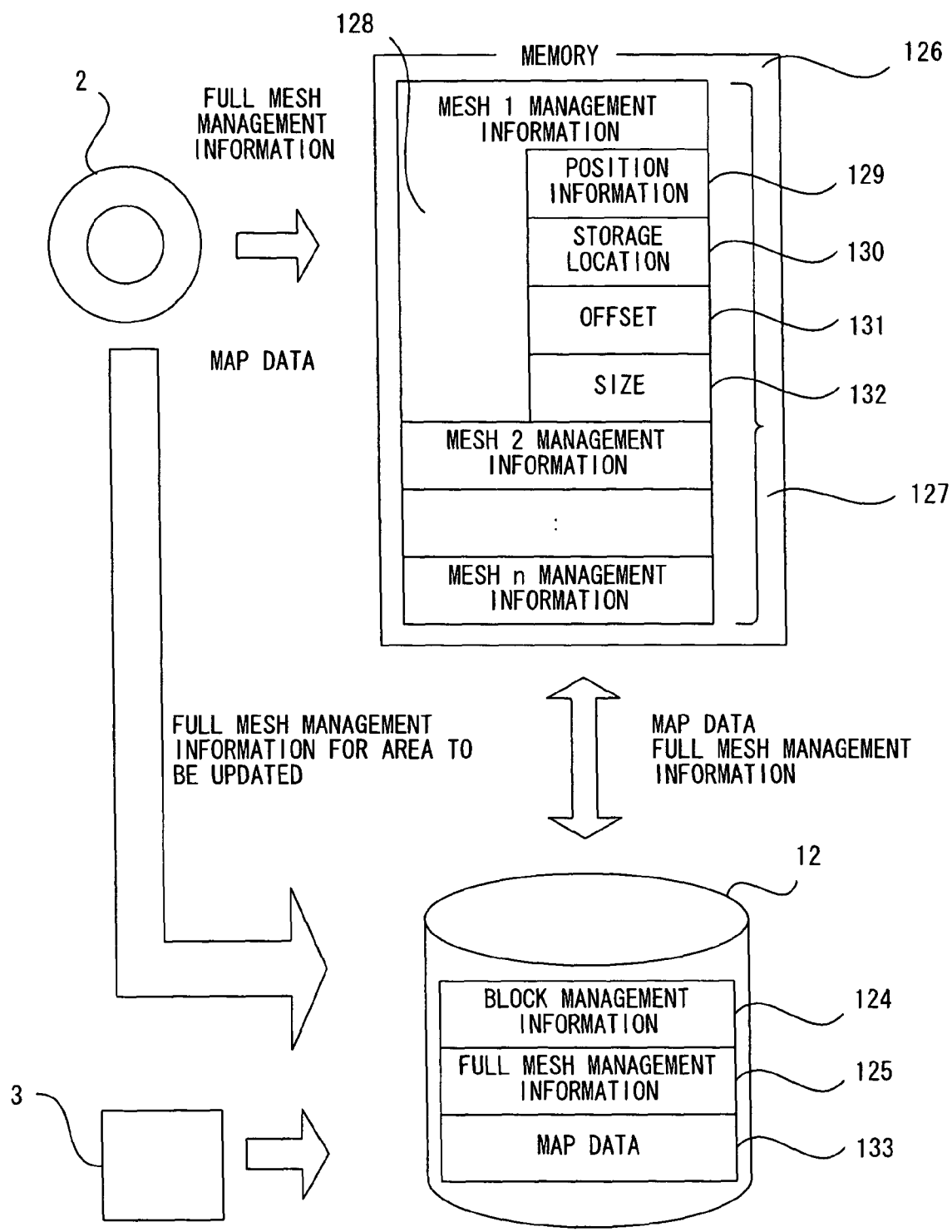
FIG. 5 illustrates how the map data are managed in the navigation system.

FIG. 5 shows how map data are managed in the navigation system 1. The navigation system 1 reads the full mesh management information and the map data from the recording medium 2, reads update map data from the removable memory 3 or from the map server 6 via the Internet 5, and is thus enabled to use the latest version of map data.

A navigation system in the related art reads data from a recording medium such as a CD ROM or a DVD-ROM alone. The navigation system achieved in the embodiment, on the other hand, uses the map data in the recording medium 2 and updated map data in combination. For this reason, it includes the nonvolatile memory 12 which is a read/write medium. The nonvolatile memory 12 is constituted of a hard disk or a flash memory, and data held in the nonvolatile memory 12 are retained even when the power to the navigation system is turned off. The nonvolatile memory 12 may be referred to as a cache medium 12 as well.

Block management information 124 is held at the nonvolatile memory 12. The block management information 124 includes identification information used to check whether the full mesh management information corresponding to the subject block is available in the recording medium 2 or in the nonvolatile memory 12. The initial value is set so as to indicate that all the full mesh management information corresponding to the individual blocks is available in the recording medium 2. As map data are updated in units of meshes, full mesh management information 125 corresponding to the block containing an updated mesh is prepared in the nonvolatile memory 12, and a value indicating that the full mesh management information for the block is available in the nonvolatile memory 12 is set in the block management information 124. The program is enabled to judge whether the full mesh management information is available in the recording medium 2 or in the nonvolatile memory 12 by first referencing the block management information 124.

Reference numeral 126 indicates a memory area where the full mesh management information is stored within the memory 15 of the navigation system. This memory area is hereafter referred to as the memory 126. After judging whether the full mesh management information is available in the recording medium 2 or in the nonvolatile memory 12, the program reads out the full mesh management information from the appropriate medium and stores the full mesh management information thus read out into the memory 126. The full mesh management information 127 read into the memory 126 includes mesh management information corresponding to meshes 1 through n. The mesh management information 128 contains position information 129, storage location data 130, offset data 131 and size data 132. The position information 129 indicates the position of the subject mesh represented by the latitude/longitude or the like of the mesh, whereas the storage location data 130 indicate whether the data are available in the recording medium 2 or in the nonvolatile memory 12. The offset data 131 indicate the position of the data in the medium (the recording medium 2 or the nonvolatile memory 12) and the size data 132 indicate the size of the map data.

After the map data in a given mesh are individually updated with the removable memory 3, the map data in the mesh are read into the nonvolatile memory 12 and are stored as map data 133. Thus, based upon the contents of the storage location data 130, the non-updated map data can be accessed at the recording medium 2 and the updated data can be accessed at the nonvolatile memory 12.

—Structure of Data in the Recording Medium—

Figure 6:
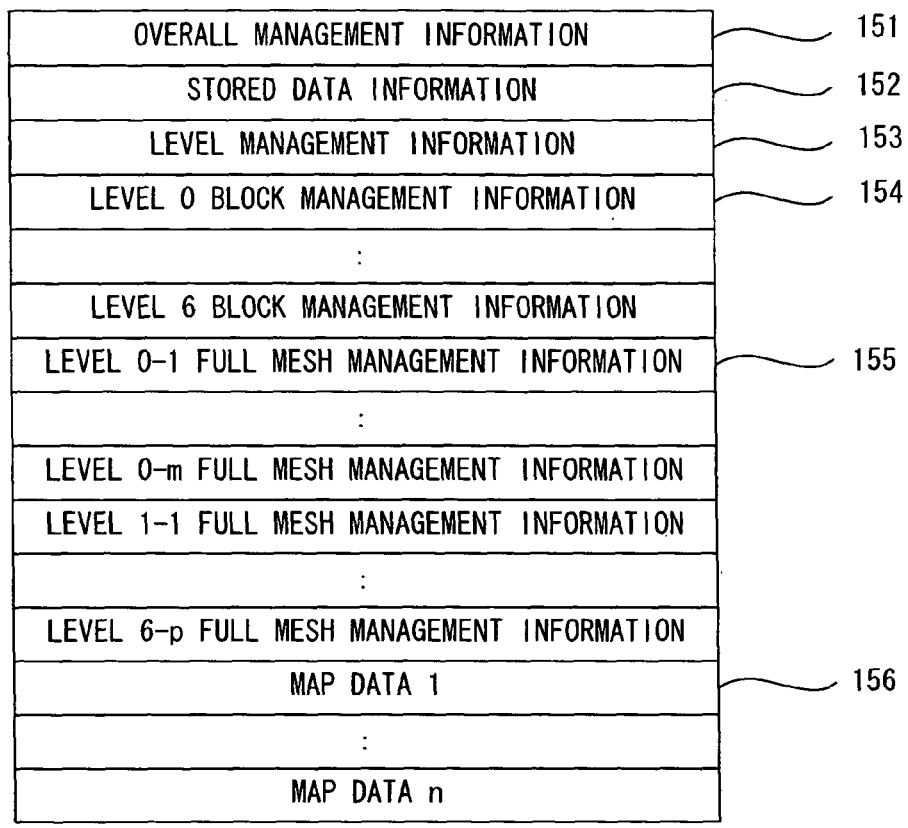
FIG. 6 shows the structure of the main data file.

Next, the data in the recording medium 2 are explained. A main data file is held in the recording medium 2. FIG. 6 shows the structure of the main data file. The main data file contains overall management information 151, stored data information 152, level management information 153, block management information 154, full mesh management information 155 and map data 156.

The overall management information 151 includes information related to the overall data, such as information on format version revisions, information on data version revisions, medium identification information, information on the data generation dates, information on the data generating parties and information on the areas covered by the data. The stored data information 152 indicates that types and the storage location of the data stored in the recording medium 2. The level management information 153 includes information on the hierarchical layer structure (the level structure) of the map data stored in the recording medium 2, information on the types of extension data attached to the data at the individual levels and information indicating the storage positions of the block management information. When map data are updated, the level management information 153 is copied into the non-volatile memory 12 and is used to change the storage location (the recording medium 2 or the non-volatile memory 12) of the block management information.

The block management information 154 includes management information used to manage the full mesh management information, such as assignment information indicating the assignment of the full mesh management information at the individual levels, information on the storage locations of the full mesh management information and information indicating the storage positions of the full mesh management information. When the recording medium 2 is loaded into the DVD drive device 14, the block management information 154 is copied into and is used in the nonvolatile memory 12. The initial value is set for the full mesh management information storage location so as to indicate that the full mesh management information is all stored in the recording medium 2. The number of sets of block management information 154 corresponds to the number of different levels of map data that are available.

The full mesh management information 155 is stored in units of individual blocks at each level. For instance, the map data at level 0 are divided into m blocks and thus, there are m sets of full mesh management information 155 in correspondence in the example presented in FIG. 6. The same principle applies to the map data at levels 1 through 6. Each set of full mesh management information 155 includes information indicating the storage locations of all the meshes contained in the corresponding block, information indicating the positions of all the meshes, information indicating the size of the meshes and history information related to all the meshes in the block.

The map data 156 are equivalent to data provided in units of individual meshes. The map data 156 are stored in the number of sets matching the sum of the numbers of all the meshes in all the blocks at all the levels of map data stored in the recording medium 2. The structure of the map data in each mesh is as shown in FIG. 4. Since different types of map data in each mesh are updated with varying update cycles, the management information and updated data are managed in the nonvolatile memory 12 and the data in the recording medium 2 are used as non-updated data. For instance, while the shapes, text and the like constituting the background data are updated frequently, the other type of map data, i.e., the extension data, is not updated as frequently. For this reason, the capacity of the nonvolatile memory 12 can be more efficiently utilized by storing the updated data into the nonvolatile memory. To enable individual management of the basic data and the extension data constituting the map data, the mesh internal management information includes history information indicating the histories of the individual types of data, and information indicating the storage locations, the storage positions and the sizes of the individual types of data.

—Structure of Data in the Nonvolatile Memory—

As shown in FIG. 5, the nonvolatile memory 12 holds the block management information 124, the full mesh management information 125, and map data 133. It also holds stored data information (not shown) and level management information (not shown). The data are stored in a file format. The stored data information and the level management information are stored in a main management file (not shown). The block management information 124 is stored in block management files, the full mesh management information 125 is stored in full mesh management information files and the map data 133 are stored in map data files.

—Main Management File—

In the main management file (not shown), stored data information and level management information copied from the recording medium 2 are stored. The stored data information is created by copying the stored data information in the main data file in the recording medium 2 when data (e.g., guidance search data) other than the data provided in units of meshes in the recording medium 2 are updated and the updated data are stored into the nonvolatile memory 12. Each time data other than the data provided in units of individual meshes are updated and the updated data are stored into the nonvolatile memory 12, the storage location of the corresponding management information is switched from the recording medium 2 to the nonvolatile memory 12.

In addition, medium identification information is contained in the stored data information so as to indicate the recording medium 2 which is the source of the particular piece of cache information. As long as this information and the medium identification information in the recording medium 2 match when they are compared with each other at startup, no problem arises. However, if they do not match (if a different recording medium is loaded), the storage location, the positions and the sizes which are managed with the individual sets of information in the nonvolatile memory 12 are inconsistent with those in the other recording medium 2 and thus, the updated data in the nonvolatile memory 12 can no longer be used. If this occurs, the navigation is executed by using the data in the recording medium 2 alone.

The level management information is created by copying the level management information in the recording medium 2 when any set of mesh data in the map data stored in the recording medium 2 is updated and the updated mesh data are stored into the nonvolatile memory 12. Each time map data are stored into the nonvolatile memory 12, the storage location of the block management information at the corresponding level is switched from the recording medium 2 to the nonvolatile memory 12. At this time, the information indicating the position and the size of the block management information, too, is updated so as to indicate the values in the nonvolatile memory 12.

—Block Management Files—

Block management files are created by copying the block management information 154 at the individual levels in the recording medium 2 into the nonvolatile memory 12 when the recording medium 2 is loaded into the DVD drive device 14. The initial values of the storage locations of the full mesh management information corresponding to the various blocks are invariably set to indicate the recording medium 2. When map data are updated and stored into the nonvolatile memory 12, the block management information at the level corresponding to the map data being updated, too, is updated. The storage location of the full mesh management information of the map data being updated is switched from the recording medium 2 to the nonvolatile memory 12. At this time, the information indicating the position and the size, too, is changed to indicate the values within the nonvolatile memory 12. The block management files are each created in correspondence to one of the different levels of map data. The file name assigned to a block management file is created by using the corresponding level as a key. Since this eliminates the need to write a block management file name, the level management information size does not become unnecessarily large.

—Full Mesh Management Information Files—

A full mesh management information file is created when map data in a mesh inside a given block are updated for the first time and the updated map data are stored into the nonvolatile memory 12, by copying the full mesh management information for the block corresponding to the map data in the recording medium 2. The storage location of the map data is switched from the recording medium 2 to the nonvolatile memory 12. At this time, the information indicating the position and the size of the map data, too, is updated to indicate the values within the nonvolatile memory 12. Subsequently, if mesh data within the same block are updated, the full mesh management information file for the block which is already in the nonvolatile memory 12 is updated. Full mesh management information files are created each in correspondence to one of the blocks. The file name assigned to a full mesh management information file is created by using the corresponding level and block management information as keys. Since this eliminates the need to write a full mesh management file name, the block management information size does not become unnecessarily large.

—Map Data Files—

A map data file is created when map data are updated and the updated map data are stored into the nonvolatile memory 12. Map data files are each created in correspondence to a specific mesh. Full mesh management information corresponding to the updated map data is created by copying the full mesh management information in the recording medium 2, and the storage location, the storage position and the size of the actually updated basic/extension data alone are updated to the values within the nonvolatile memory 12. Data in the recording medium 2 are referenced when non-updated basic/extension data are needed. Map data files are created each in correspondence to a specific mesh. The file name assigned to a map data file is created by using the corresponding level, block management information and full mesh management information as keys. Since this eliminates the need to write a map data file name, the map management information size and the block management information size do not become unnecessarily large.

FIG. 4 shows the structure of the data in a single mesh 103 or 105 in FIG. 3. The mesh data are constituted with the mesh internal management information 111, the background (for map display) data 112, the locator data 113, the network (for route calculation) data 114 and the guidance data 115. The mesh internal management information 111 and the background (for map display) data 112 constitute basic data, whereas the locator data 113, the network data 114 and the guidance data 115 constitute extension data. The basic data are included at all the levels of data. The mesh data at a given level contain specific extension data inherent to the level. For instance, the network data are contained in the data at levels 1, 2, 3 and 4 alone, whereas the locator data and the guidance data are provided in the data at level 0 alone. It is to be noted that address calculation data, image data, VICS data, building attribute data, peripheral area search data and the like may also be provided as extension data.

—Basic/Extension Data in the Map Data—

As shown in FIG. 4, each set of map data is constituted with basic data which include the mesh internal management information 111 and the background (for map display) data 112 and extension data which include a plurality of different types of data such as the locator data 113, the network data 114 and the guidance data 115. The following is an explanation of the various types of data (frames) constituting the map data.

—Mesh Internal Management Information—

Figure 7:
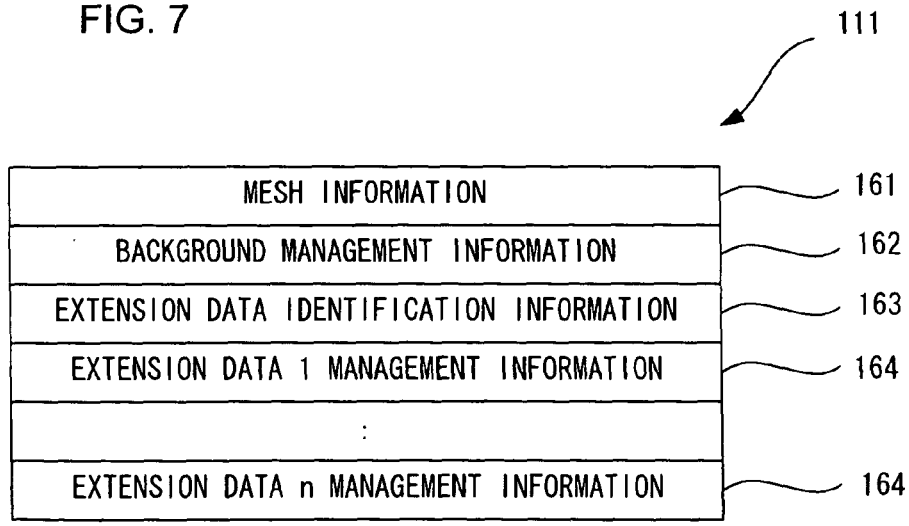
FIG. 7 shows the structure of the mesh internal management information.

Each set of mesh internal management information 111 includes information inherent to the map data contained in the corresponding mesh and information indicating the storage locations, the positions, the sizes and the like of the stored background and extension data. FIG. 7 shows the structure of the mesh internal management information 111. The mesh internal management information 111 is constituted with mesh information 161, background management information 162, extension data identification information 163 and extension data management information 164.

As the mesh information 161, basic information such as the size of the mesh internal management information, the actual size of the corresponding mesh taken along the vertical and horizontal directions and the like is stored. The background management information 162 contains management information related to the background data (map display data) in the mesh. More specifically, history information, information indicating the storage location, information indicating the storage position, offset information and information indicating the size are stored as the background management information. As the history information, the management number assigned to updated information, for instance, is stored, and the management number bears a larger value to indicate a more recent data version. As the storage location information, an identification flag indicating whether the data are stored in the recording medium 2 or the nonvolatile memory 12 is stored. The storage position at which the background data are stored is written as the storage position information. If the background data are stored in the recording medium 2, the storage position is indicated as the offset from the beginning of the main data file, whereas the storage position is indicated as the offset from the beginning of the corresponding map data file itself if the background data are stored in the nonvolatile memory 12. The actual size of the background data is stored as the size information.

The background data are managed by further dividing the area contained in each mesh into n×m portions. Thus, there are n×m sets of background management information in correspondence to a given mesh. The background data are updated individually in units of the partitioned mesh portions (n×m mesh portions).

As explained earlier, a given level of map data does not necessarily include all the types of extension data. In addition, even when a given type of information can be added on, it may not always be contained in all the meshes. For instance, the network data are not contained in a mesh holding data constituted entirely of a body of water. For this reason, the types of extension data that can be added onto the corresponding mesh and the presence/absence of the individual types of extension data are written as the extension data identification information 163. The sets of extension data management information 164, the number of which matches the number of different types of extension data that can be added onto the mesh data, are provided in the order specified in the information.

Each set of extension data management information 164 contains management information for the corresponding type of extension data. The various types of extension data are each managed as are the background data. History information of the extension data is managed in correspondence to a specific type of extension data.

—Background Data—

While the background data (map display data) 112 may be managed in units of individual meshes, they are managed by further dividing the area contained in each mesh into n×m portions in the embodiment, so as to allow the data to be handled at a small screen with small memory, as in a portable telephone. The background data 112 are updated in units of single divided portions (in units of single mesh portions). The standardized size of the background data is set to 256×256 (a coordinate value assumes a value between 0 and 256) per mesh portion. A given mesh may contain, for instance, 4×4 mesh portions. In this case, the standardized size of the background data corresponding to one mesh is 1021×1021, since the coordinate value 255 in a given mesh portion equals the coordinate value 0 in the adjacent mesh portion and thus, the number of coordinate points is calculated to be 1021 by subtracting 3 from 256×4.

While the standardized size is smaller than the size of other map data, this does not pose any problem in actual use since the background data contained in only up to a single mesh portion can be displayed over a range containing approximately 320×260 points. In addition, since the number of bits used in correspondence to a single coordinate point can be reduced, the size of the overall data can be reduced as well.

Various background shapes are managed over up to 256 layers and are each drawn with the drawing attribute corresponding to a specific layer. While the background data in the existing navigation data are divided into approximately 16 different classes and the different classes of background data are each assigned with specific drawing attributes, there are not enough classes to indicate various types of background objects in a map of an urban area or the like with distinguishable colors. For this reason, the number of layers that are equivalent to the classes in the related art is increased to 256. The background objects are drawn in the order in which the corresponding background data were stored. In the case of the existing navigation data, data indicating the shapes of objects in a given type are all stored continuously. Thus, the shapes of objects of the same type that need to be drawn in a different order, e.g., a road running under an elevated express highway and a road running astride an express highway) cannot be displayed correctly, or an extra class needs to be created unnecessarily. By drawing various shapes of background objects in the order matching the order with which the corresponding data were stored, it is ensured that the number of layers does not need to increase.

In some existing navigation data, a single type of road shape data is used for both display and for map matching networking, so as to reduce the data volume by using the same road shape data for the display and the search. In the embodiment, the storage of road shape data used as the background data is switched for each level of data. An advantage of storing road shape data as background data lies in that when drawing a map, the map can be drawn through a single access without having to perform a plurality of accesses to acquire different types of data such as background data, road data and text data. In addition, since the road shapes only need to be indicated as background, their shapes and connections can be drastically simplified or exaggerated to make it possible to reduce the volume of the display data and improve the display speed.

—Locator Data—

The locator data express roads with links, nodes and link strings. A node may be an intersecting point or a special point specified on a road. A link is equivalent to a road connecting nodes, whereas a link string is a string of a plurality of links representing a single road. The locator road data, which are provided in the road map data at the lowermost level 0, are used when verifying the position of the subject vehicle, obtaining the route coordinates resulting from a route search, conducting a narrow urban street search and the like. The road data used as locator data hold information similar to the types of information held in the navigation data in the related art. Namely, roads sharing a common attribute are managed as a collection of road data which are managed in the form of link strings. The road attributes are divided into two primary groups, i.e., road attributes assigned to individual link strings and road attributes assigned to individual links or individual nodes.

The attributes assigned to individual link strings include road types, toll/toll-free designation, infrastructure object attributes and route calculation target flags and the like. The attributes assigned to links or nodes include link types, widths, intersecting link information, regulation information and interpolation point coordinate information. The number of standardized coordinate points in the locator data is 2048× 2048. The standardized size of the locator data differs from that of the background data (1021×1021) since the locator data need to assure a higher degree of coordinate accuracy.

An explanation is now given on how the connections with the roads in an adjacent mesh are achieved when the locator data in a given mesh have been updated.

Link string data corresponding to a given link string in the locator data are constituted of a string of sets of data related to nodes present in the link string. The data related to each node include data indicating the positional coordinates of the node, the link number assigned to a link connecting with the node and the like. The standardized coordinate values are used to indicate the positional coordinates of the node.

Figure 8:
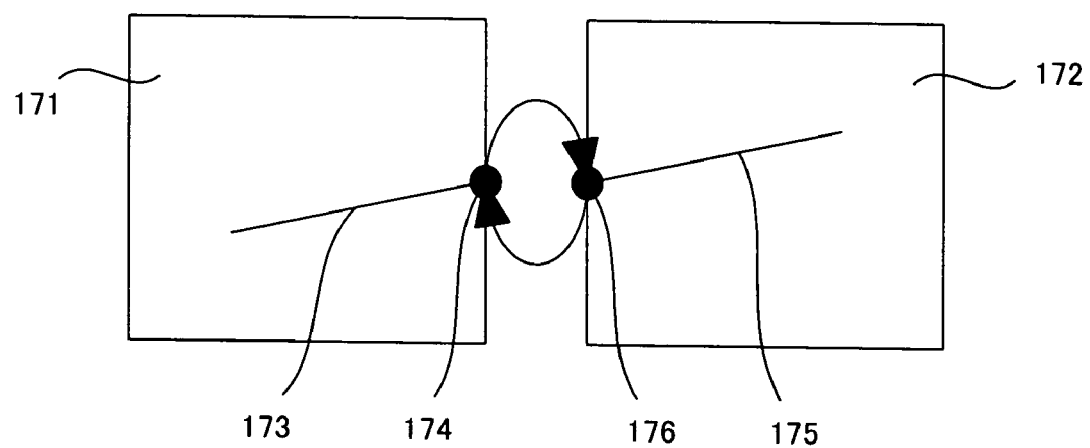
FIG. 8 shows a single road that is present over adjacent meshes.

FIG. 8 shows a road that extends over two adjacent meshes. A mesh 171 and a mesh 172 lie adjacent to each other, and a single road represented by a link 173 and a link 175 extend through the meshes 171 and 172. A connecting point set on the road at each mesh boundary constitutes a node. At the mesh 171, a node 174 is set as the connecting point node, whereas a node 176 is set as the connecting point node at the mesh 172.

The data related to each node contains the positional coordinates of the node and the link number assigned to the link connecting with the node along one direction. For instance, the positional coordinates of the node 174 and the link number of the link 175 connecting with the node 174 to the right are stored for the node 174. The positional coordinates of the node 176 and the link number of the link 173 connecting with the node 176 to the left are stored for the node 176.

If the mesh 171 and the mesh 172 contain data sharing the same history, the points at which they should be connected with each other can be specified by checking the link numbers assigned to the connecting links. However, the link number assigned to the link 175 may change due to an update of the data in the mesh 172. In such a case, the connecting points at the mesh boundary can no longer be identified with the link numbers.

In the embodiment, the connecting points are identified by conducting a search to ascertain whether or not a connecting point with the same positional coordinates is present at the adjacent mesh if data have been updated. Namely, meshes are connected by using standardized coordinate values of the connecting points. An adjacent mesh itself is identified by using the mesh position information or the like as in the related art.

It is to be noted that if the data in a mesh are updated without updating the data in an adjacent mesh following the construction of a new road, a road to connect to the new road may not be found in the data in the non-updated mesh. In such a case, the road is processed as a dead end in the data even when the road actually continues on into the non-updated mesh. Under these circumstances, it is more desirable to update the locator data for the adjacent mesh as well. Accordingly, an update request that the map data in the adjacent mesh be updated may be automatically transmitted if the map server 6 can be accessed via the Internet. Alternatively, a display or the like may be brought up so as to prompt the user to transmit a map data update request.

—Network (Route Calculation) Data—

The lowest level of data that contain the network data as extension data is level 1 (scaling factor 1/25,000), and is used for reference. The network data are also stored as extension data of data at a plurality of higher levels. As are the locator data, the network data, too, are prepared based upon the concept of links, nodes and link strings. The network data contain connection information indicating how nodes representing intersecting points connect with other nodes. Each node holds subject node information and adjacent node information on each adjacent node with which the subject node connects. As the subject node information, the positional coordinates of the subject node are stored, whereas information related to all the nodes that connect with the subject node is stored as the adjacent node information. As the node information of a connecting node, the node number assigned to the node and the link number assigned to a link connecting to the node are stored.

The range within which a single set of network data are contained as the same as the range containing the corresponding map data, and the standardized size of each mesh is 2048×2048.

The structure of the network data which greatly differs from that of the existing navigation data is the correlation of nodes and links in adjacent meshes and also among different levels. In the case of the existing navigation data, a node in a given mesh or at a given level is made to correlate to the same node in an adjacent mesh or at a different level by directly referencing the index number or the offset information. In contrast, data are updated in units of individual meshes and new and old data are utilized in combination in the embodiment. For this reason, the node/link correlation cannot be directly referenced by checking the index numbers or the offset information, unlike in the related art.

As long as history information for the network data in a mesh matches history information for the network data in an adjacent mesh or as long as history information for the network data in a higher-order mesh matches history information for the network data in a lower-order mesh, the node/link correlation can be referenced by using the index number or the like as in the related art. However, if the sets of history information do not match, the correlation cannot be referenced by using index numbers or the like. Accordingly, the coordinate values of the connecting points at the mesh boundaries are used as keys in the embodiment, as is done with the locator data. As a connecting point used to correlate different levels to each other, a node present both in a higher-order level mesh and in a lower-order level mesh, which is not necessarily on the mesh boundary, is selected.

When searching for a matching node in an adjacent mesh simply by using the coordinate values as a key, the set of coordinate values and the node will achieve a one-to-one match at the lowest-order (most detailed) level unless there are roads intersecting each other on the mesh boundary, since node coordinates are defined at the resolution of the standardized coordinates at the lowermost order level. For this reason, the matching node can always be searched even though it takes a considerable length of search time. However, the matching node cannot be accurately searched in higher-order level network data simply by using coordinate values as a key, since there is a possibility that a plurality of different nodes may exist at the same coordinates. Namely, when two nodes present in close proximity to each other, they are defined with different coordinate values at a lower-order level. However, the coordinate values may be rounded and, as a result, the two nodes may be indicated with the same coordinate values at a higher-order level. In such a case, the two nodes cannot be distinguished from each other and thus, an accurate search cannot be conducted.

For this reason, the coordinate values at the lowermost layer level, too, are used as a key, as well as the coordinate keys in the embodiment. As a result, even when there are a plurality of nodes with the same coordinate values at a higher level, the coordinate keys of the same nodes, which are used as sub keys, at the lowermost level are different and the matching node can be searched with accuracy. In addition, since there may be a plurality of nodes with the same coordinate values even at the lowermost level, a 4-bit extension coordinate value (within a range of 0 through 15) is attached to the coordinate values of each node at the lowermost layer.

With (Xh, Yh) representing the standardized coordinates of a node at a higher-order level, (X1, Y1) representing the standardized coordinates of the node at the lower-order level and α representing the extension coordinate value, the standardized coordinates of the node at a given higher-order level can be defined by the combination of (Xh, Yh), (X1, Y1) and (α).

Through the measures described above, data at different levels can be connected with a high degree of reliability as well as data in adjacent meshes, even when newer versions of data are used together with the original version of data. It is to be noted that corresponding meshes at different levels are identified by using level correspondence tables provided each in correspondence to a given level of data. In a level correspondence table, information that indicates a specific node at a lower-order level that corresponds to a node at the subject level also indicates the mesh containing the corresponding node. Thus, by using the level correspondence table and the definition of the standardized coordinates explained above, connecting points at different levels can be accurately matched. Even when the data in a given mesh at a lower-order level alone have been updated, the use of the level correspondence tables and the standardized coordinates allow any road that remains unchanged after the update to maintain the connection with the non-updated higher-order level data. In addition, while a newly added road or a road having undergone a change in shape in an updated mesh cannot connect with the non-updated higher-order level data, an erroneous connection of such a road, at least, can be averted.

The position of a mesh is normally indicated by the latitude and the longitude of the lower left corner of the mesh. Namely, each set of position information 129 in the full mesh management information holds position information corresponding to the latitude and longitude of the lower left corner of the subject mesh. In addition, the standardized coordinates in the mesh are indicated by setting the lower left corner of the mesh as the origin point. Accordingly, the standardized coordinates explained earlier indicate various positions in the map as two-dimensional coordinate values corresponding to specific latitudinal and longitudinal values based upon the mesh position information indicating the mesh position by its latitude and longitude. Such two-dimensional coordinate values, which correspond to latitudinal and longitudinal values, may be considered to be universal values that remain unaffected by differences among various navigation systems and standards. In other words, adjacent meshes and meshes at higher and lower levels are connected by using universal keys.

It is to be noted that the standardized coordinates of the node at a higher-order level may be instead defined so as to be indicated with the combination of (Xh, Yh) and (X1, Y1) or the combination of (Xh, Yh) and (α).

In addition, the standardized node coordinates (X1, Y1) at the lower-order level do not need to be the coordinates at the lowermost level. The coordinates at any appropriate lower level may be used as such. The extension coordinate α is a parameter other than the standardized coordinates and may be, for instance, height data indicating the height of the node. Alternatively, it may be time data (information) related to the data generation/update. Moreover, the extension coordinate α may be set by combining the height data and the time data. The data size of α may be greater than four bits, as well.

The standardized coordinates described above are defined by using a parameter such as the coordinates (X1, Y1) at another level or the height data (α), in addition to the two-dimensional coordinates (Xh, Yh) at the subject level. Since this parameter is used to attach PS information to the two-dimensional coordinates so as to indicate the connecting state between different levels in the embodiment, it is referred to as a level correspondence key in the description of the embodiment. It may be otherwise referred to as a 2.5 dimensional space key.

In the embodiment, the correspondence between nodes at different levels is indicated in the level correspondence tables each provided in correspondence to a given level. For this reason, the level correspondence keys of the various levels do not need to hold the standardized coordinates at all the lower levels. For instance, they may hold the standardized coordinates at the lowermost level alone. When the standardized node coordinates at level 0 are (X0, Y0), the standardized node coordinates at level 1 are (X1, Y1), the standardized node coordinates at level 2 are (X2, Y2) and the standardized node coordinates at level 3 are (X3, Y3), the level correspondence keys for the node at the individual levels are defined as follows. The level correspondence key at level 0 is defined as (X0, Y0), the level correspondence key at level 1 is defined by the combination of (X1, Y1) and (X0, Y0), the level correspondence key at level 2 is defined by the combination of (X2, Y2) and (X0, Y0) and the level correspondence key at level 3 is defined by the combination of (X3, Y3) and (X0, Y0).

—Guidance Data—

The guidance data that are included in the map data at the lowermost layer level 0 only are used when providing route guidance along the route resulting from a route search. As the guidance data, information indicating intersecting point names, information indicating road names, information indicating directional terms, directional guidance information, spot guidance information, information on landmarks in surrounding areas, information on road construction and the like is stored.

—Data Update with the Removable Memory—

Figure 9:
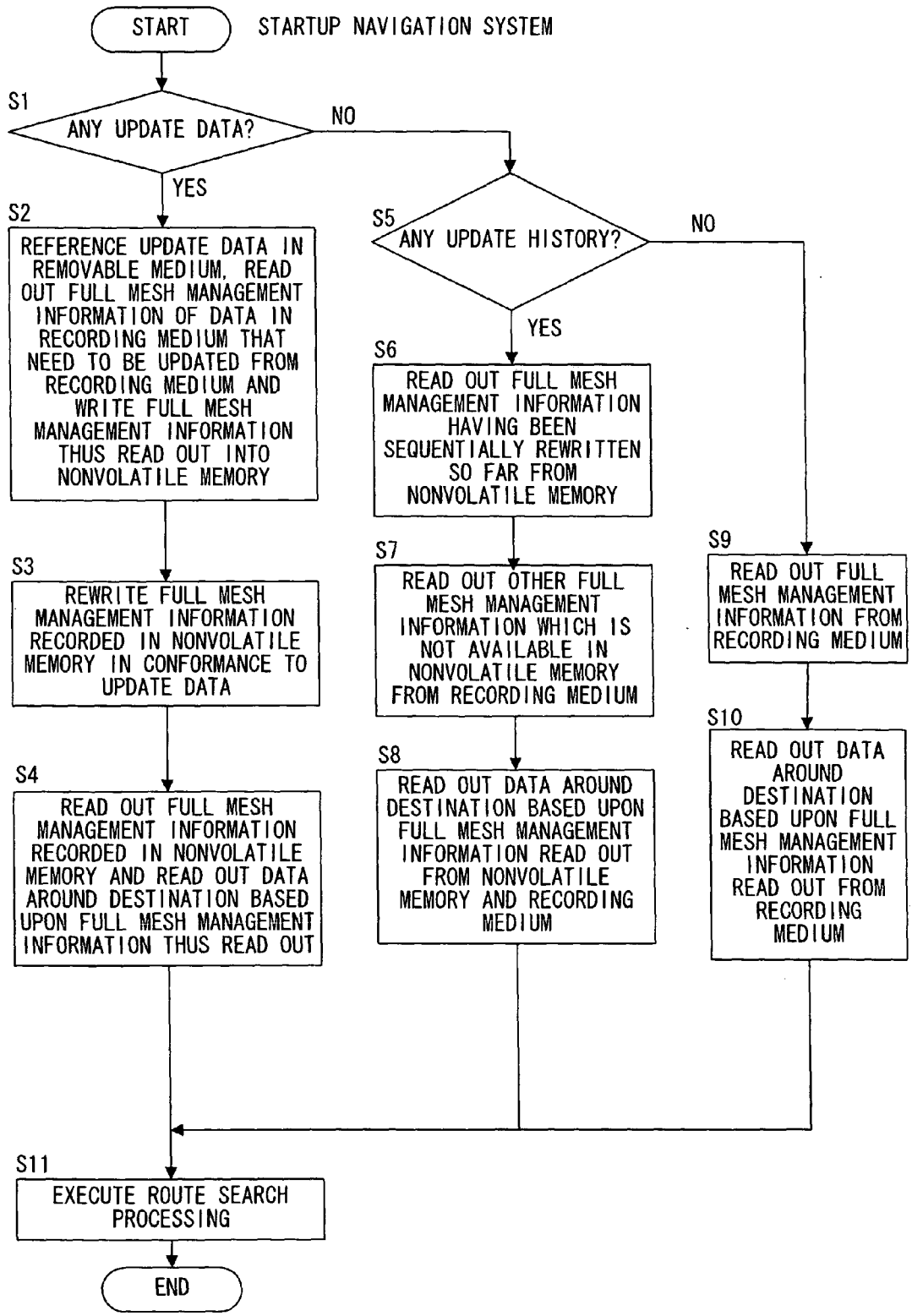
FIG. 9 presents a flowchart of the processing through which map data are updated by using a removable memory, data of an area around the destination are read and a route search is executed.

FIG. 9 presents a flowchart of the processing through which map data are updated with the removable memory 3, data of an area around the destination are read out and a route search is executed. The update data are provided in the removable memory 3. Control, the flow of which is shown in the flowchart in FIG. 9, is executed by the control device 11.

As the power to the navigation system 1 is turned on, the program that executes the processing as shown in the flowchart presented in FIG. 9 is started up. In step S1, a decision is made as to whether or not there are any update data. The decision as to whether or not there are any update data is made by judging whether or not a removable memory 3 having stored therein update data is currently loaded. If it is decided that there are update data, the operation proceeds to step S2.

In step S2, the update data in the removable medium 3 are referenced, the full mesh management information corresponding to the data in the recording medium 2 that need to be updated is read out from the recording medium 2 and the full mesh management information thus read out is written into the nonvolatile memory 12. In step S3, the full mesh management information recorded in the nonvolatile memory 12 is rewritten in conformance to the update data. In step S4, data of an area around the destination are read out based upon the full mesh management information recorded in the nonvolatile memory 12. In the previous explanation, the update data are written in the nonvolatile memory 12. However, in this example, the update data are simply read from the removable memory 3 by directly loading the removable memory 3. Non-updated map data are read from the recording medium 2.

If, on the other hand, it is decided in step Si that there are no update data, the operation proceeds to step S5. In step S5, a decision is made as to whether or not there is a history of an update. The decision as to whether or not there is an update history is made by accessing the block management information 124 in the nonvolatile memory 12. If it is decided in step S5 that there is an update history, the operation proceeds to step S6. In step S6, the full mesh management information that has been sequentially rewritten to the current version is read out from the nonvolatile memory 12 by referencing the block management information 124. In step S7, the full mesh management information that is not stored in the nonvolatile memory 12 is read out from the recording medium 2 by referencing the block management information 124. In step S8, data of an area around the destination are read out as in step S4, based upon the full mesh management information read out from the nonvolatile memory 12 and the recording medium 2.

If it is decided in step S5 that there is no update history, the operation proceeds to step S9. In step S9, the full mesh management information is read out from the recording medium 2. Next, in step S10, data of an area around the destination are read out from the recording medium 2 based upon the full mesh management information read out from the recording medium 2.

In step S11, a route search is executed by using the map data that have been read. While only the data of an area around the destination are read in the flowchart presented in FIG. 9, the route search is executed by sequentially reading data around the current position as well.

—Data Update Through Communication with the Map Server—

Figure 10:
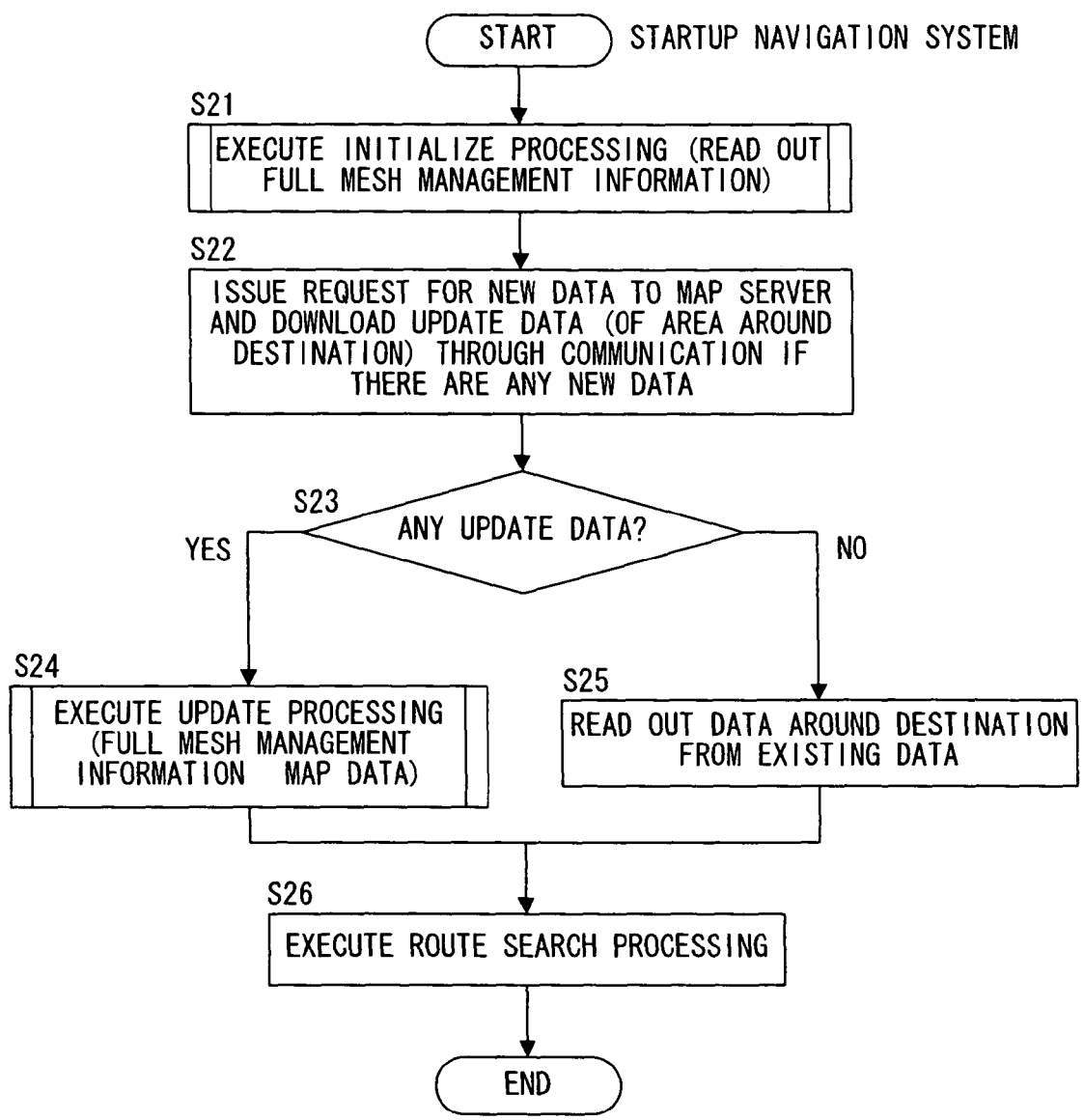
FIG. 10 presents a flowchart of the processing through which data of an area around the destination read from the map server via the Internet are used for an update, data of an area around the current position and an area around the destination are read and a route search is executed.

FIG. 10 presents a flowchart of the processing through which data of an area around the destination read from the map server 6 via the Internet 5 are used for an update of data for an area around the current position and the data of the area around the destination are read out, and a route search is executed. The update data are provided from the removable memory 3 and the map server 6. Control, the flow of which is shown in the flowchart presented in FIG. 10, is executed by the control device 11.

Figure 11:
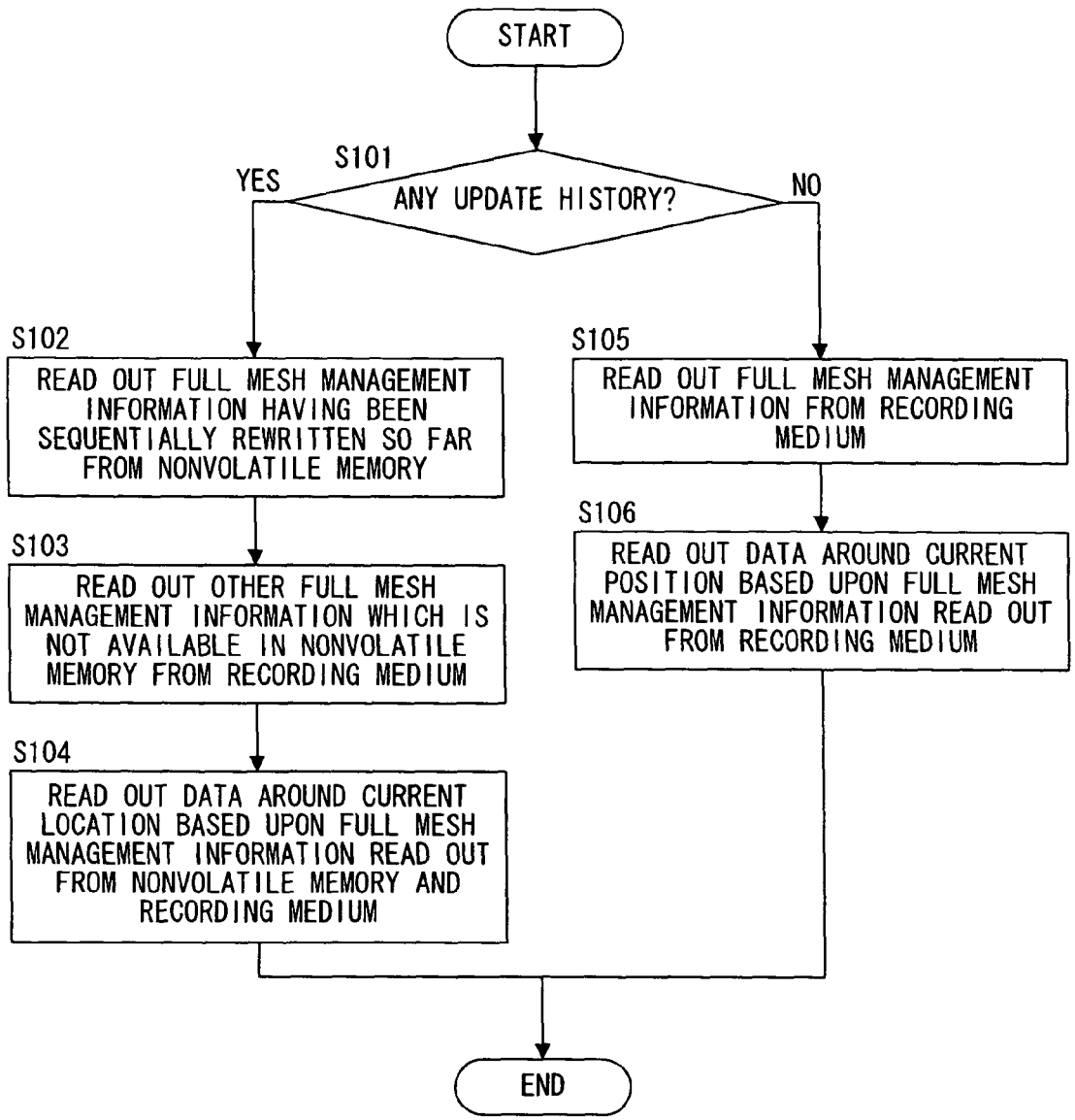
FIG. 11 presents a flowchart of the initialize processing executed in step S21 in FIG. 10.

As the power to the navigation system 1 is turned on, the program that executes the processing as shown in the flowchart presented in FIG. 10 is started up. In step S21, initialize processing including a read of the full mesh management information is executed. FIG. 11 presents a flowchart of the initialize processing.

In step S101 in FIG. 11, a decision is made as to whether or not there is a history of an update. The decision as to whether or not there is an update history is made by accessing the block management information 124 in the nonvolatile memory 12. If it is decided in step S101 that there is an update history, the operation proceeds to step S102. In step S102, the full mesh management information that has been sequentially rewritten to the current version is read out from the nonvolatile memory 12 by referencing the block management information 124. In step S103, the full mesh management information that is not stored in the nonvolatile memory 12 is read out from the recording medium 2 by referencing the block management information 124. In step S104, data of an area around the current position are read out based upon the full mesh management information read out from the nonvolatile memory 12 and the recording medium 2. Next, the operation proceeds to step S22 in FIG. 10.

If, on the other hand, it is decided in step S101 that there is no update history, the operation proceeds to step S105. In step S105, the full mesh management information is read out from the recording medium 2. Next, in step S106, data of an area around the current position are read out from the recording medium 2 based upon the full mesh management information read out from the recording medium 2. Next, the operation proceeds to step S22 in FIG. 10.

The data of the area around the destination are read in step S22 and subsequent steps in FIG. 10. In step S22, a request for new data is issued to the map server 6, and if there are any new data, the update data (of the area around the destination) are downloaded through communication. In step S23, a decision is made as to whether or not there are any update data. The decision as to whether or not there are any update data is made by judging whether or not any update data have been transmitted from the map server 6. If it is decided that there are update data, the operation proceeds to step S24 to execute update processing.

Figure 12:
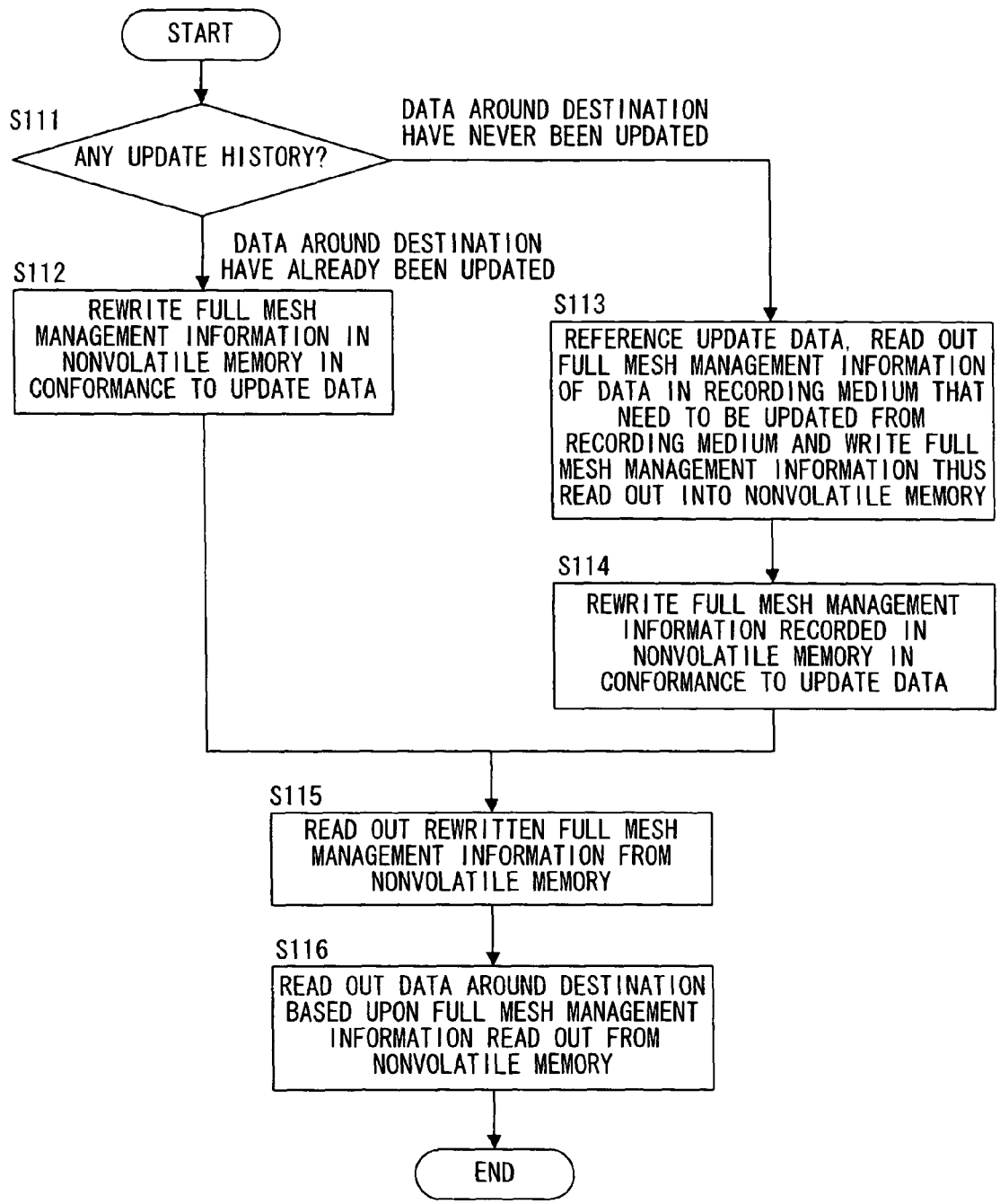
FIG. 12 presents a flowchart of the update processing executed in step S24 in FIG. 10.

FIG. 12 presents a flowchart of the update processing. In step Sill in FIG. 12, a decision is made as to whether or not there is an update history with regard to the data of the area around the destination, i.e., whether or not the data of the area around the destination have ever been updated. If it is decided that the data have been updated, the operation proceeds to step S112. In step S112, the full mesh management information already stored in the nonvolatile memory 12 is rewritten in conformance to the update data having been transmitted from the map server 6. Then, the operation proceeds to step S115.

If, on the other hand, it is decided in step S111 that the data of the area around the destination have never been updated, the operation proceeds to step S113. In step S113, the update data having been transmitted from the map server 6 are referenced, the full mesh management information corresponding to the data in the recording medium 2 that need to be updated is read out from the recording medium 2 and the full mesh management information thus read out is written into the nonvolatile memory 12. In step S114, the full mesh management information recorded in the nonvolatile memory 12 is rewritten in conformance to the update data. Subsequently, the operation proceeds to step S115.

In step S115, the full mesh management information that has been rewritten is read from the nonvolatile memory 12 into the memory 126. In step S116, the data of the area around the destination are read out based upon the full mesh management information read out from the nonvolatile memory 12. Then, the operation proceeds to step S26 in FIG. 10.

If it is decided in step S23 in FIG. 10 that no update data have been transmitted from the map server 6, the operation proceeds to step S25. In step S25, the data of the area around the destination contained in the existing data are read out. Namely, the data are read out either from the recording medium 2 or the nonvolatile memory 12 if the data have been previously updated. In step S26, a route search is executed based upon the map data having been read.

—Route Search Executed by using Level Correspondence Keys—

Figure 13:
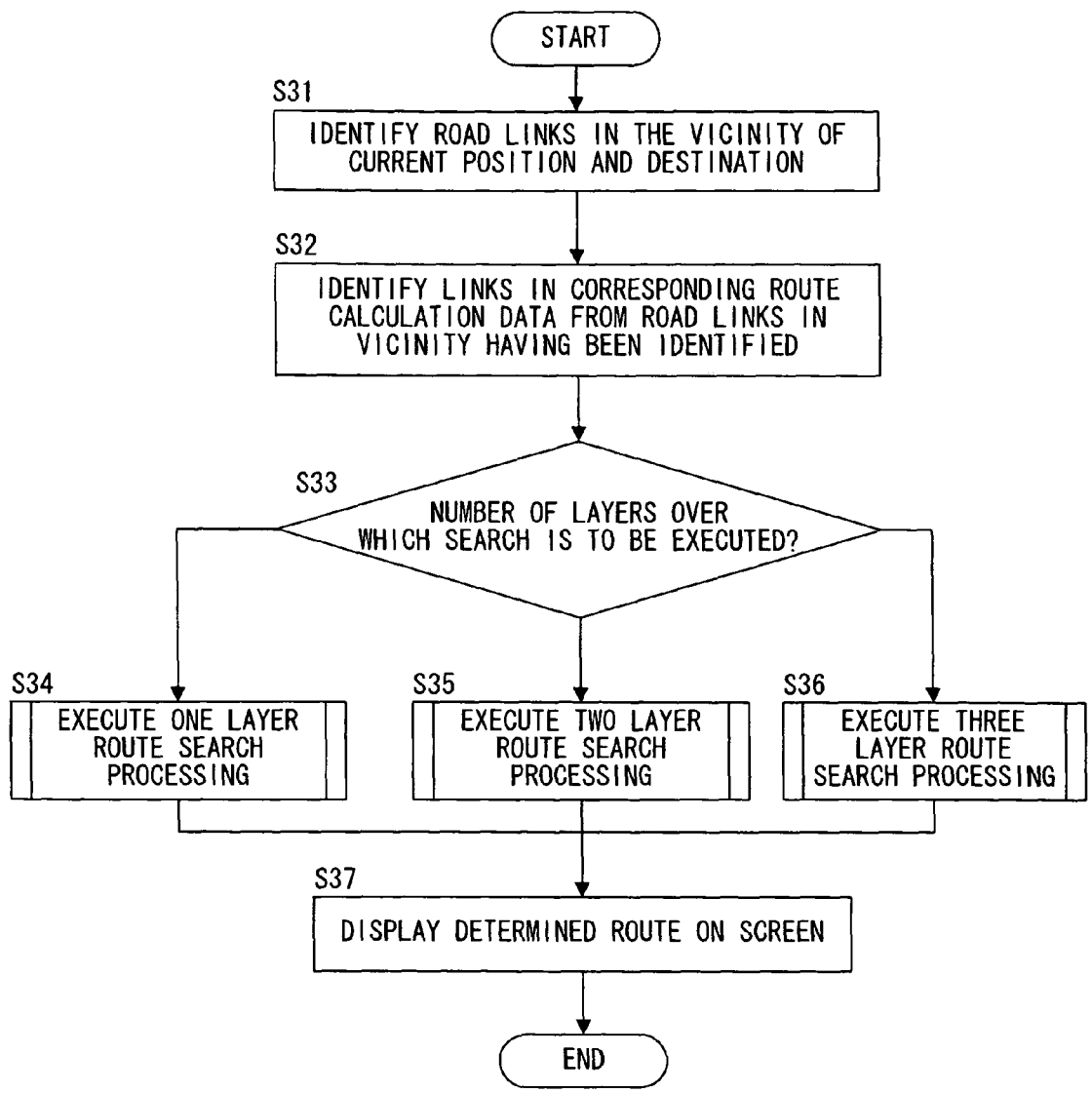
FIG. 13 presents a flowchart of the route search executed by using level correspondence keys.

FIG. 13 presents a flowchart of a route search executed by using level correspondence keys. In step S31, road links in the vicinity of the current position and the destination are individually identified by using the current position information and the destination information. In step S32, the links bearing the corresponding route calculation data among the road links in the vicinity of both the current position and the destination are identified. In step S33, a decision is made as to the number of hierarchical layers (levels) over which the search is to be executed. The decision on the number of hierarchical layers over which the search is to be executed is determined in correspondence to the distance between the current position and the destination. If the distance between the current position and the destination is small, one layer route search processing is executed, whereas two layer route search processing or three layer route search processing is executed as the distance between the current position and the destination becomes larger.

The network data at the lowermost layer level (with the most detail) are normally used in the vicinity of the current position and the destination in the route search. Accordingly, if the current position and the destination are close to each other, only the network data at the lowermost layer level are utilized. However, if the current position and the destination are set apart from each other, the network data at a higher layer level (on the wider range side) are used for the search of the intermediate route in order to reduce the length of time required for the route search. Accordingly, the network data at the lowermost layer level are used for the areas around the current position and the destination and the network data at the higher layer level are used to search for the intermediate route. Namely, the two layer route search processing or the three layer route search processing is executed.

If it is decided in step S33 that the one layer route search processing is to be executed, the operation proceeds to step S34. If it is decided that the two layer route search processing is to be executed, the operation proceeds to step S35. If it is decided that the three layer route search processing is to be executed, the operation proceeds to step S36.

Figure 14:
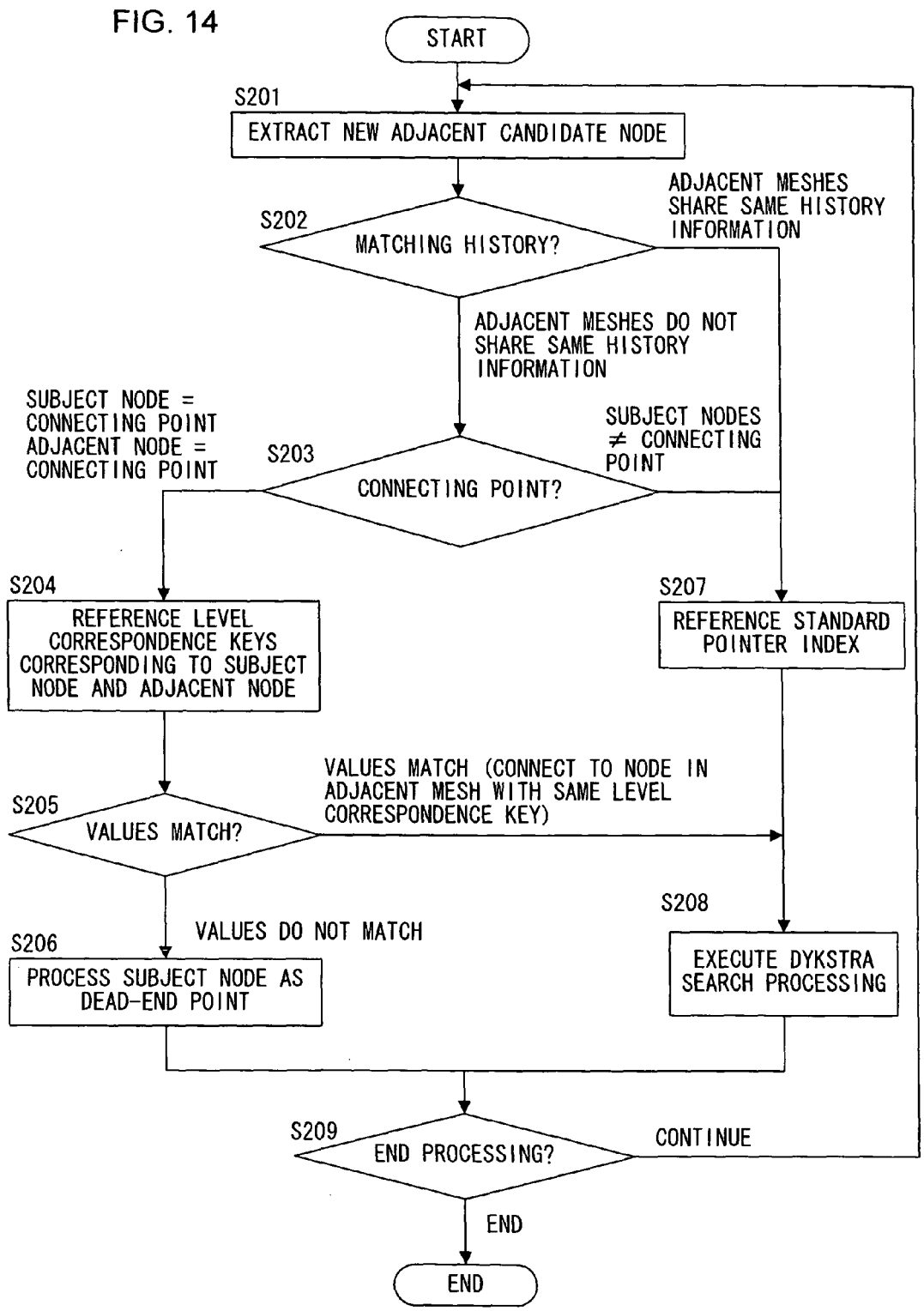
FIG. 14 presents a flowchart of the one layer hierarchical route search processing.

FIG. 14 presents a flowchart of the one layer route search processing. In step S201, a new adjacent candidate node is extracted. At this time, and adjacent candidate link may instead be extracted. In step S202, a decision is made as to whether or not the adjacent meshes needed in the route search share the same history information. If it is decided that they share the same history information, the operation proceeds to step S207, whereas if it is decided that they do not share the same history information, the operation proceeds to step S203. In step S207, the adjacent node is identified by referencing a standard pointer index. The standard pointer index may be the node number or the node ID.

In step S203, a decision is made as to whether or not the subject node is a connecting point. Adjacent meshes connect at a connecting point, and a point positioned at the mesh boundary is set as a connecting point in the one layer route search. The operation proceeds to step S207 if it is decided that the subject node is not a connecting point, whereas the operation proceeds to step S204 if the subject node is judged to be a connecting point and the adjacent node, too, is judged to be a connecting point. If the subject node is not a connecting point, all the adjacent nodes connecting with the subject node are contained within the same mesh. When the subject node is a connecting point, the adjacent node in the adjacent mesh, too, is a connecting point.

In step S204, the level correspondence keys of the subject node and the adjacent node are referenced. In step S205, a decision is made as to whether or not the level correspondence keys of the subject node and the adjacent node match. The operation proceeds to step S208 if they are judged to match, whereas the operation proceeds to step S206 if it is decided that they do not match. If the level correspondence keys of the subject node and the adjacent nodes match, it is assumed that the correct adjacent node has been identified, and accordingly, the subject node is connected with the node with the identical level correspondence key in the adjacent mesh.

In step S206, the subject node is processed as a dead-end point. Namely, if an adjacent node with a matching level correspondence key has not been found, it is concluded that the route is cut off at that point. It is to be noted that the processing in step S204 and step S205 has been explained by assuming that one connecting point is present at each adjacent mesh. However, there may be a plurality of connecting points on the mesh boundary. In such a case, it is necessary to determine through a search the exact connecting point in the adjacent mesh with which the subject node connects. Accordingly, the processing in steps S204 and S205 needs to be repeatedly executed for the plurality of connecting points in the adjacent mesh until the correct adjacent node is identified.

If it is decided in step S203 that the subject node is not a connecting point, the operation proceeds to step S207 to identify the adjacent node by referencing the standard pointer index, since the subject node and the adjacent node are both contained in the data corresponding to the same mesh. It is to be noted that processing for identifying the adjacent node by referencing the pointer index is simpler and can be executed faster than the processing for identifying the adjacent node by referencing the level correspondence keys.

In step S208, Dijkstra route search processing is executed by using the node information corresponding to the identified node, and then the operation proceeds to step S209. In step S209, a decision is made as to whether or not the entire route search processing has been completed, and if it is judged that the route search processing has not been completed yet, the operation returns to step S201. If it is judged that the route search processing has been completed, the one layer route search processing ends.

Figure 15:
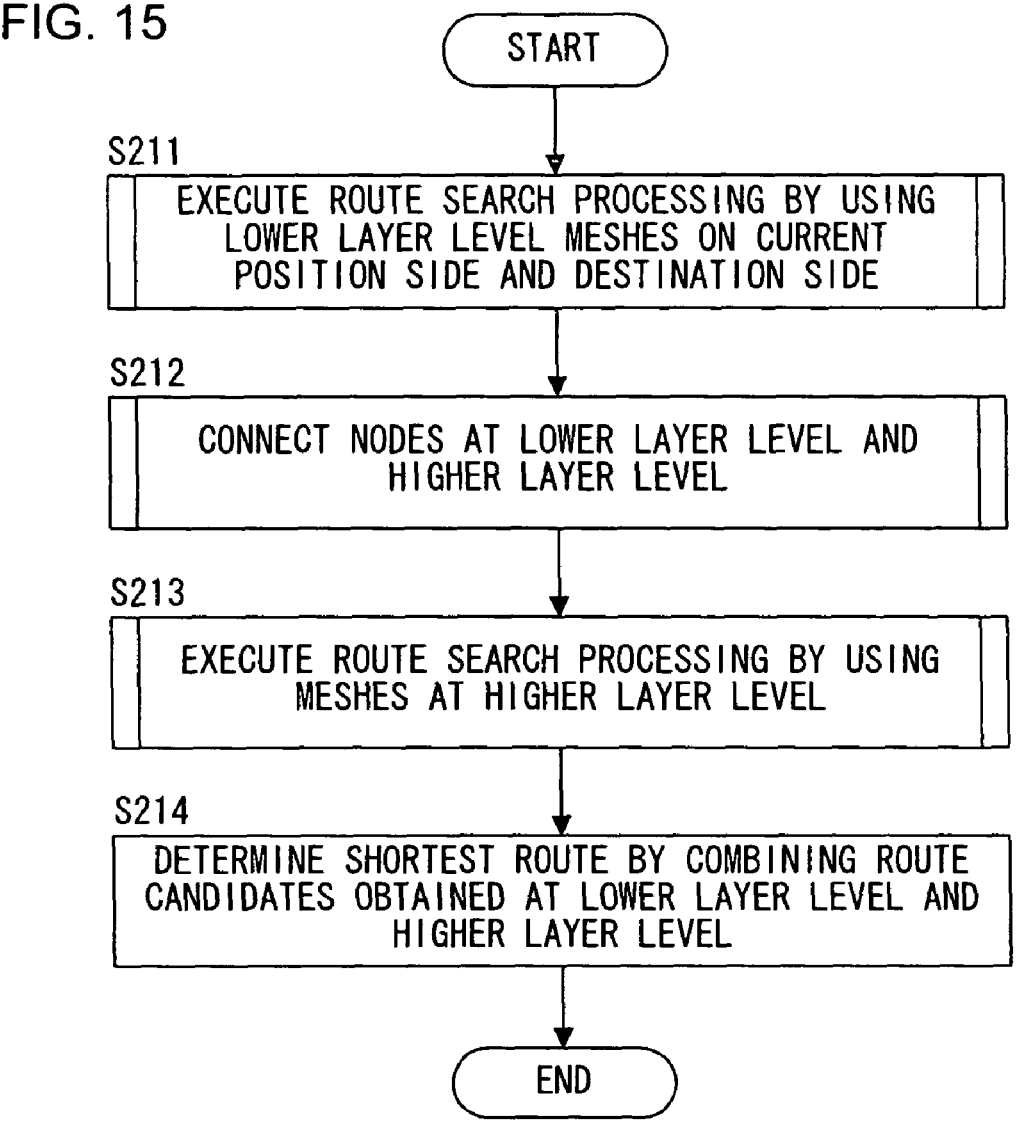
FIG. 15 presents a flowchart of the two layer hierarchical route search processing.
Figure 16:
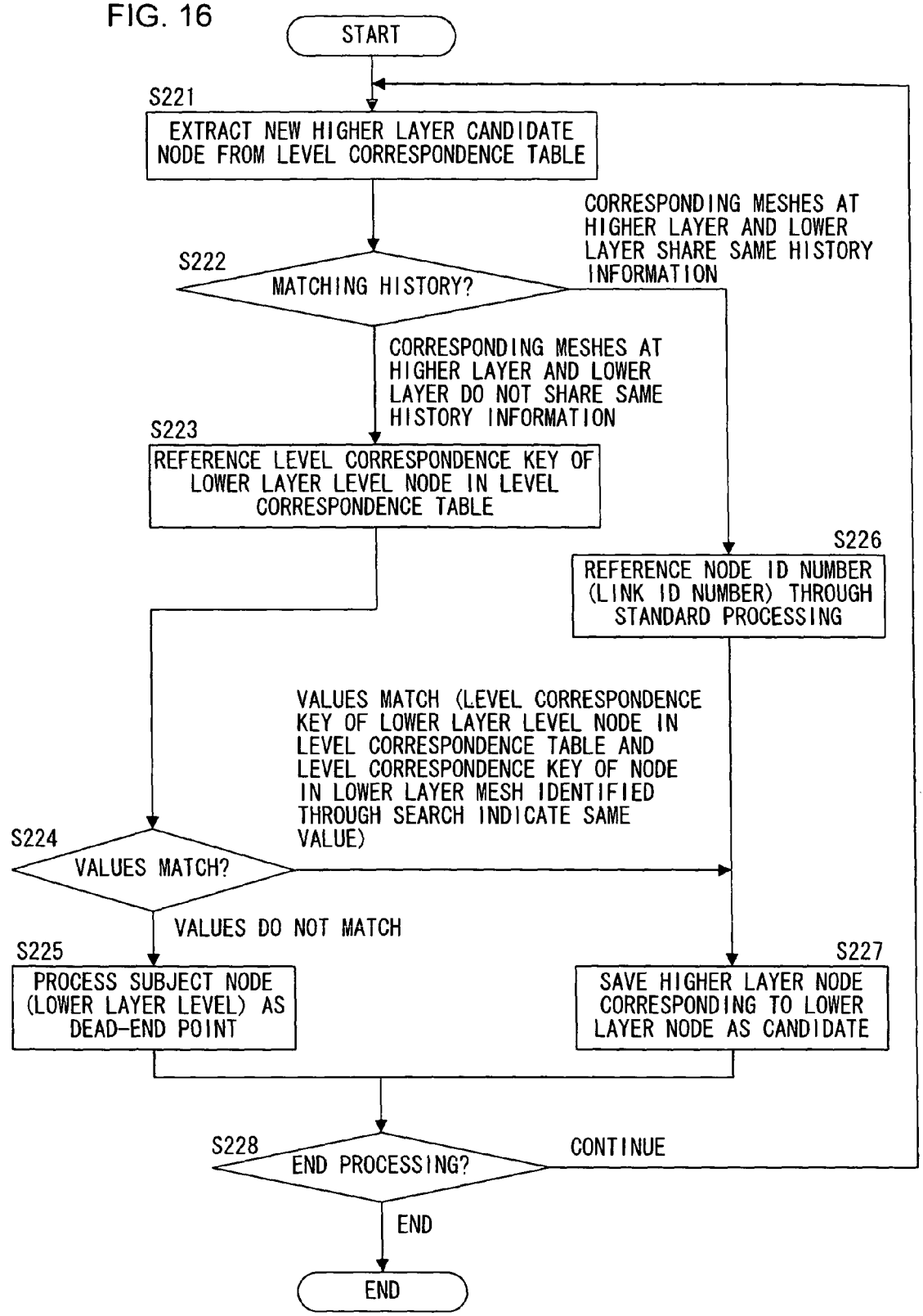
FIG. 16 is a detailed flowchart of the processing executed in step S212 in FIG. 15.

FIG. 15 presents a flowchart of the two layer route search processing. In step S211, route search processing is executed by using meshes at a lower layer level on the current position side and on the destination side. This route search processing is identical to the one layer route search processing shown in FIG. 14. In step S212, processing is executed to connect nodes at the lower layer level and the higher layer level. FIG. 16 is a detailed flowchart of the processing executed in step S212.

In step S221 in FIG. 16, a new higher layer candidate node is extracted by referencing the level correspondence table explained earlier. In the level correspondence table, which is provided on the higher layer level side (on the wider range side), information indicating the exact node on the lower layer level side (the more detailed side) that corresponds to each node at the higher layer level and the specific mesh containing the corresponding node is stored. In step S222, a decision is made as to whether or not the corresponding meshes at the higher layer level and the lower layer level share the same history information. If it is decided in step S222 that the corresponding meshes at the higher layer level and the lower layer level do not share identical history information, the operation proceeds to step S223.

In step S223, the level correspondence key of the node at the lower layer level in the level correspondence table is referenced. In step S224, a decision is made as to whether or not the level correspondence key of the node at the lower layer level in the level correspondence table matches the level correspondence key of the node in the lower layer mesh obtained through the search. The operation proceeds to step S227 if they are determined to match, whereas the operation proceeds to step S225 if it is decided that they do not match. In step S225, the subject node at the lower layer level is processed as a dead-end point.

If, on the other hand, it is decided in step S222 that the corresponding meshes at the higher layer level and the lower layer level share identical history information, the operation proceeds to step S226. In step S226, the higher layer level node is identified by referencing the node ID number (by executing standard processing). In step S228, the higher layer node corresponding to the lower layer node, which has been identified, is saved as a candidate. In step S228, a decision is made as to whether or not the processing has been completed, and if it is decided that the processing is to be executed continuously, the operation returns to step S221 to repeatedly execute the processing. If, on the other hand, it is judged that the processing is to end, the processing for connecting the nodes at the lower layer level and the higher layer level shown in FIG. 16 ends, and the operation proceeds to step S213 in FIG. 15.

In step S213, route search processing is executed by using meshes at the higher layer level. Since the processing executed in step S213 is identical to the one layer route search processing in FIG. 14, its explanation is omitted. In step S214, the shortest route is determined by combining the route candidates determined at the lower layer level and the higher layer level.

As explained above, the following advantages are achieved by adopting the map data structure and the map data processing method achieved in the embodiment.

(1) Since map data can be updated in units of individual meshes, the entire recording medium, such as a DVD ROM, in which the map data are stored, does not need to be replaced with a new recording medium when the map data are partially updated. Since the minimum data update units are individual meshes, i.e., since data can be updated in units of individual sets of basic data and extension data, data that do not need to be updated are not updated and thus, the volume of data that need to be communicated (the communication cost) can be minimized. In addition, individual sets of basic data and extension data can be updated over varying cycles.

(2) Since update data can also be provided through communication via the Internet, the latest version of the update data can be made available quickly at low cost.

(3) Since the mesh data are divided into basic data and extension data, the map data can be commonly used in navigation systems that only require map display and navigation systems that also execute route search processing and guidance processing. In addition, the extension data are further divided by data types. Thus, update data assuming a uniform structure simply need to be provided even when only a specific type of extension data, but not other types of extension data, is required. The background data are managed separately from the other types of data such as the locator data and the network data. For this reason, a map can be drawn through a single access instead of having to access a plurality of groups of data such as the background, the roads and the text. Moreover, since the roads and their connections in the background can be displayed in a drastically simplified and exaggerated manner so as to achieve a reduction in the volume of the display data and an improvement in the display speed.

(4) Since the mesh data are divided into basic data and extension data, the map data can be provided from a single map database to simple systems such as portable telephones and high-end systems such as on-vehicle navigation systems alike. For instance, the basic data alone need to be provided to display a map and provide navigation at a portable telephone, whereas both the basic data and the extension data are provided to on-vehicle navigation systems.

(5) Data in adjacent meshes or at higher and lower levels are connected by using two-dimensional coordinate values corresponding to the latitudinal and longitudinal values, and thus, the data update method does not need to conform to a specific navigation system model or standard. Namely, two-dimensional coordinates corresponding to latitudinal and longitudinal values are universal data and by using such data, the data update method can be standardized.

(6) Since a supplementary parameter is used in addition to the two-dimensional coordinate values, the matching node can be identified with a high degree of reliability. For instance, by using height data as the additional parameter, even a connecting point at an intersection of elevated roads can be reliably distinguished. Furthermore, by using the coordinate values at the lower layer level as the additional parameter, a node or the like can be identified at the resolution at the lower layer level. In other words, the data at a higher level and a lower level with different scaling factors can be reliably connected.

(7) Since the map data are managed by storing the full mesh management information in the nonvolatile memory, the update data can be managed easily and reliably. As a result, program development for navigation systems and the like are facilitated.

(8) The method whereby the correct boundary node to connect with each boundary node is ascertained by searching for a boundary node with matching coordinate values in an adjacent mesh is only adopted in updated meshes instead of in all meshes, and boundary nodes in non-updated meshes are searched through the conventional pointer reference method. As a result, the data processing speed is not lowered unnecessarily.

(9) Since the update data for an area selected by the user are delivered and the user does not receive the update data for the entire nation delivered in a batch, the length of time required for the data reception is minimized. In addition, since the entire map data are not recorded into a large capacity read/write storage device, a storage capacity that allows only the update data requested by the user to be stored will suffice.

(10) In the explanation of the embodiment provided above, the extension coordinate value α, which is a parameter that may be constituted with the height data indicating the height of the node or the time data (information) related to the data generation/update, is set as part of a level correspondence key. Such an extension coordinate value α does not need to be provided in correspondence to all the boundary nodes present at mesh boundaries, and instead, the extension coordinate value α may be set only in conjunction with some of the boundary nodes for a specific reason. For instance, the extension coordinate value α may be attached to boundary nodes with matching coordinates that intersect on a mesh boundary, so as to minimize the extent of an increase in the data volume and maintain the data processing speed at the highest possible level.

While an explanation is given above in reference to the embodiment on an example in which the control program executed by the control device 11 of the navigation system is stored in a ROM, the present invention is not limited to this example. The control program and an installation program used to install the control program may be provided in a recording medium such as a DVD. It is to be noted that the recording medium does not need to be a DVD, and instead, it may be any of various types of recording media including a CD ROM and magnetic tape.

In addition, these programs may be provided via a transmission medium such as a communication line, a typical example of which is the Internet. Namely, the programs may be converted to signals on a carrier wave through which a transmission medium is carried. When providing the programs in a recording medium or via the Internet, they can be provided to the navigation system in a configuration identical to that shown in FIG. 1. For instance, the recording medium 2 may be used as a recording medium in which the programs are provided and the map server 6 may be used as a server that provides the application program. Thus, the programs can be distributed as a computer-readable computer program product adopting any of various modes such as a recording medium and a carrier wave.

Furthermore, a car navigation system may be achieved by executing the control program described above on a personal computer. In such a case, the current position detection device 13, the input device 19 and the like should be connected to specific I/O ports or the like of the personal computer.

While an explanation is given above in reference to the embodiment on an example in which update data are provided from the removable memory 3, the present invention is not limited to this example. Instead, update data may be written into a CD ROM or a DVD ROM and then be provided by temporarily replacing the recording medium 2 with the CD ROM or the DVD ROM.

While an explanation is given above in reference to the embodiment on an example in which the initial map data are read from the recording medium 2, the present invention is not limited to this example. The initial map data may be received via the Internet 5, stored into the non-volatile memory 12 and then used and managed as update data by adopting the method described earlier. In addition, map data may be received via the Internet as they become needed, the received map data may be stored into the non-volatile memory 12 each time, and they may be updated and managed through the method described earlier whenever it becomes necessary to update them.

While an explanation is given above in reference to the embodiment on an example in which the route search is executed in the navigation processing, the present invention is not limited to this example. Any of various other types of navigation processing including map display and route guidance can be executed by using the map data described above.

While an explanation is given above in reference to the embodiment on an example in which the nonvolatile memory 12 is installed inside the navigation system 1, the present invention is not limited to this example and the nonvolatile memory 12 may instead be an external storage device which is connected through a cable or the like.

While an explanation is given above in reference to the embodiment on an example in which the background (for map display) data constitute basic data and the network data constitute extension data, the present invention is not limited to this example. For instance, the network data may instead be designated as basic data if map data (the network data and the like) are utilized in an application in which no map is displayed. More specifically, the network data may be used as basic data in an application in which a route search is executed and guidance for the vehicle is provided along the advancing direction with an arrow or the like alone, since no background data for map display) are required in such a navigation system. In this case, the network data are the data with the highest priority, and the network data alone may be updated in units of individual meshes. Namely, the map data with the highest priority that are commonly used in a plurality of specific model types should be used as the basic data in a given application.

While the invention has been particularly shown and described with respect to a preferred embodiment thereof by referring to the attached drawings, the present invention is not limited to these examples and it will be understood by those skilled in the art that various changes in form and detail may be made therein without departing from the spirit, scope and teaching of the invention.

The invention claimed is:

1. A map data processing apparatus, comprising:
a recording medium drive unit that receives a recording medium in which are recorded map data including a structure having map-related information, and a structure having management information for the map-related information;
an update data acquisition unit that obtains update data for the map-related information; and
a computer processor that updates the map-related information recorded in the recording medium by using the update data obtained by the update data acquisition unit and the management information, and executes processing of the map data based upon the map-related information recorded in the recording medium, the update data obtained by the update data acquisition unit and the management information, wherein:
a plurality of levels are defined, each in correspondence to one of a plurality of different scaling factors at which a map is rendered;
a plurality of sets of the map-related information are provided in correspondence to the plurality of levels;
the map is divided into a plurality of divisions at each level, and each of the plurality of sets of map-related information, corresponding to a given level, is divided into units corresponding to the plurality of divisions into which the map is divided;
the divided map-related information corresponding to each of the units at all levels comprises basic data;
the divided map-related information corresponding to each of the units at one or more specific levels but not all levels comprises extension data;
the basic data and the extension data are provided separately from each other in case that both the basic data and the extension data are provided in the divided map-related information corresponding to each of the units;
the basic data is used to display the map at a display device;
the extension data contains information used in route search; and
the computer processor executes processing of the map data by using the divided map-related information comprising the basic data and the extension data;
wherein the divided map-related information corresponding to each of the units further comprises information that indicates whether the extension data is present or absent.

2. The map data processing apparatus according to claim 1, wherein:
the map is divided into a plurality of first divisions, the first divisions are each divided into a plurality of second divisions, a number of the second divisions is equal among the individual first divisions, and the divisions into which the map is divided each corresponding to one of the second divisions; and
the management information contains a set of management information related to the plurality of second divisions, provided in correspondence to each of the first divisions.

3. The map data processing apparatus according to claim 2, wherein:
the management information further contains management information related to the plurality of first divisions.

4. The map data processing apparatus according to claim 1, wherein:
the map is divided into a plurality of first divisions at each level, the first divisions are each divided into a plurality of second divisions, the number of second divisions is equal among the individual first divisions, and the divisions into which the map is divided each corresponding to one of the second divisions; and
the management information contains a set of management information related to the plurality of first divisions provided in correspondence to each of the levels, and also contains a set of management information related to the plurality of second divisions provided in correspondence to each of the first divisions.

5. The map data processing apparatus according to claim 1, wherein:
the basic data is prepared in order not to exceed a predetermined upper data size limit; and
the computer processor executes processing of the map data by using the divided map-related information where the basic data is prepared in order not to exceed the predetermined upper data size limit.

6. The map data processing apparatus according to claim 5, wherein:
the basic data includes at least information used to display the map at the display device.

7. The map data processing apparatus according to claim 1, wherein:
the map data are map display data; and
the computer processor displays the map at the display device by connecting the map data recorded in the recording medium with the update data obtained by the update data acquisition unit.

8. The map data processing apparatus according to claim 1, wherein:
the map data are route search data; and
the computer processor executes route search processing by connecting the map data recorded in the recording medium with the update data obtained by the update data acquisition unit.

9. A map data processing apparatus, comprising:
a recording medium drive unit that receives a recording medium in which are recorded map data including a structure having map-related information, and a structure having management information for the map-related information, the map-related information comprising data used in route search;
an update data acquisition unit that obtains update data for the map-related information; and
a computer processor that updates the map-related information recorded in the recording medium by using the update data obtained by the update data acquisition unit and the management information, and executes processing of the map data based upon the map-related information recorded in the recording medium, the update data obtained by the update data acquisition unit and the management information, wherein:
a plurality of levels are defined, each in correspondence to one of a plurality of different scaling factors at which a map is rendered;
a plurality of sets of the map-related information are provided in correspondence to the plurality of levels;
the map is divided into a plurality of divisions at each level, and
each of the plurality of sets of map-related information, corresponding to a given level, is divided into units corresponding to the plurality of divisions into which the map is divided;
a connecting point, at which the map-related information corresponding to one of two divisions is correlated to the map-related information corresponding to the other division, is present at a geographically matching position within the two divisions, the two divisions respectively belonging to levels different from each other; and
sets of information related to the connecting point contain common two-dimensional coordinate values indicating the position of the connecting point within the map in the map-related information corresponding to the two divisions;
two-dimensional coordinate values of the connecting point at a given level further contain two-dimensional coordinate values of the connecting point at a level at which the map is rendered in greater detail than a given level; and
the computer processor executes processing of the map data by using the two-dimensional coordinate values of the connecting point at the given level to which the two-dimensional coordinate values of the connecting point at the level at which the map is rendered in greater detail are attached;
wherein the two-dimensional coordinate values are values corresponding to latitudinal and longitudinal values.

10. The map data processing apparatus according to claim 9, wherein:
the information related to the connecting point contains a parameter other than the two-dimensional coordinate values of the connecting point in addition to the two-dimensional coordinate values.

11. The map data processing apparatus according to claim 10, wherein:
the parameter contains height information indicating a height of the connecting point.

12. The map data processing apparatus according to claim 10, wherein:
the parameter contains time information related to generation and update of divided map-related information corresponding to one of the units.

13. The map data processing apparatus according to claim 9, wherein:
the divided map-related information corresponding to each of the units comprises basic data available at all levels and extension data available at one or more specific levels but not all levels, the basic data and the extension data are provided separately from each other;
the basic data is used to display the map at a display device; and
the extension data contains information used in route search.

14. A map data processing apparatus, comprising:
a recording medium drive unit that receives a recording medium in which are recorded map data including a structure having map-related information, and a structure having management information for the map-related information;
an update data acquisition unit that obtains update data for the map-related information; and
a computer processor that updates the map-related information recorded in the recording medium by using the update data obtained by the update data acquisition unit and the management information, and executes processing of the map data based upon the map-related information recorded in the recording medium, the update data obtained by the update data acquisition unit and the management information, wherein:
the map-related information is divided into units corresponding to a plurality of divisions into which a map is divided;
the divided map-related information corresponding to each of the units is separated into basic data and extension data to be individually managed, the basic data having higher priority than the extension data;
the basic data is prepared in order not to exceed a predetermined upper data size limit;
the computer processor executes processing of the map data by using the divided map-related information where the basic data is prepared in order not to exceed the predetermined upper data size limit; and
when a data size of the basic data exceeds the predetermined upper data size limit after an update, at least map-related information corresponding to an excess beyond the predetermined upper data size limit, which results from the update, is prepared as the extension data.

15. The map data processing apparatus according to claim 14, wherein:
the basic data includes at least information used to display the map at a display device; and
the extension data includes information that enables display of a more detailed map at the display device, compared to the map displayed by using the basic data.

* * * * *